US012804520B2

(12) United States Patent
Lei et al.

(10) Patent No.: US 12,804,520 B2
(45) Date of Patent: Nov. 17, 2026

(54) SYSTEM INFORMATION ACQUISITION FOR FLEXIBLE SPECTRUM INTEGRATION

(71) Applicant: QUALCOMM Incorporated, San Diego, CA (US)

(72) Inventors: Jing Lei, San Diego, CA (US); Yongle Wu, San Diego, CA (US); Kazuki Takeda, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 296 days.

(21) Appl. No.: 18/626,894

(22) Filed: Apr. 4, 2024

(65) Prior Publication Data

US 2025/0317837 A1 Oct. 9, 2025

(51) Int. Cl.
*H04W 72/04* (2023.01)
*H04W 48/14* (2009.01)

(52) U.S. Cl.
CPC ........... *H04W 48/14* (2013.01); *H04W 72/04* (2013.01)

(58) Field of Classification Search
CPC ..... H04W 48/14; H04W 72/04; H04W 16/14; H04W 48/16; H04W 48/12; H04L 5/001; H04L 5/0053; H04L 5/0092
See application file for complete search history.

(56) References Cited

U.S. PATENT DOCUMENTS

2014/0051426 A1 2/2014 Siomina et al.
2018/0227911 A1* 8/2018 Belghoul .............. H04L 1/1854
2019/0037508 A1 1/2019 Sun et al.
2021/0258065 A1* 8/2021 Wang ................. H04B 7/06964
2022/0046603 A1* 2/2022 Hosseini ................. H04W 4/40
2022/0210844 A1 6/2022 Molavianjazi et al.
2025/0007639 A1* 1/2025 Haag ................... H04L 41/5019

FOREIGN PATENT DOCUMENTS

CA 2834556 A1 * 11/2012 ............ H04W 48/12
WO WO-2021113581 A1 * 6/2021 .......... H04W 68/005
WO WO-2023151463 A1 * 8/2023 ........ H04W 74/0833

OTHER PUBLICATIONS

International Search Report and Written Opinion—PCT/US2025/018965—ISA/EPO—Jun. 16, 2025.
XIAOMI: "Views on Multi-carrier Enhancement in Rel-19", RP-232246, 3GPP Tsg Ran# 101, 3rd Generation Partnership Project, Mobile Competence Centre, 650, Route Des Lucioles, F-06921, Sophia-antipolis Cedex, France vol. Ran WG1, No. Bangalore, India, 20230911 - 20230915, Sep. 4, 2023, XP052515498, 10 p. Page 8.

* cited by examiner

*Primary Examiner* — Lan-Huong Truong
(74) *Attorney, Agent, or Firm* — HARRITY & HARRITY, LLP

(57) ABSTRACT

Various aspects of the present disclosure generally relate to wireless communication. In some aspects, a user equipment (UE) may transmit a first indication of support for flexible spectrum integration (FSI). The UE may receive a second indication of network assistance information for communicating in a network using a virtual cell that is provided by a candidate network node, the virtual cell being based at least in part on the FSI. Numerous other aspects are described.

20 Claims, 12 Drawing Sheets

SYSTEM INFORMATION ACQUISITION FOR FLEXIBLE SPECTRUM INTEGRATION

FIELD OF THE DISCLOSURE

Aspects of the present disclosure generally relate to wireless communication and specifically relate to techniques, apparatuses, and methods for system information acquisition for flexible spectrum integration.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a user equipment (UE). The method may include transmitting a first indication of support for flexible spectrum integration (FSI). The method may include receiving a second indication of network assistance information for communicating in a network using a virtual cell that is provided by a candidate network node, the virtual cell being based at least in part on the FSI.

Some aspects described herein relate to a method of wireless communication performed by a network node. The method may include receiving a first indication of support for FSI. The method may include transmitting a second indication of network assistance information for communicating in a network using a virtual cell that is provided by a candidate network node, the virtual cell being based at least in part on the FSI.

Some aspects described herein relate to an apparatus for wireless communication at a UE. The apparatus may include one or more memories and one or more processors coupled to the one or more memories. The one or more processors may be configured to transmit a first indication of support for FSI. The one or more processors may be configured to receive a second indication of network assistance information for communicating in a network using a virtual cell that is provided by a candidate network node, the virtual cell being based at least in part on the FSI.

Some aspects described herein relate to an apparatus for wireless communication at a network node. The apparatus may include one or more memories and one or more processors coupled to the one or more memories. The one or more processors may be configured to receive a first indication of support for FSI. The one or more processors may be configured to transmit a second indication of network assistance information for communicating in a network using a virtual cell that is provided by a candidate network node, the virtual cell being based at least in part on the FSI.

Some aspects described herein relate to a non-transitory computer-readable medium that stores a set of instructions for wireless communication by a UE. The set of instructions, when executed by one or more processors of the UE, may cause the UE to transmit a first indication of support for FSI. The set of instructions, when executed by one or more processors of the UE, may cause the UE to receive a second indication of network assistance information for communicating in a network using a virtual cell that is provided by a candidate network node, the virtual cell being based at least in part on the FSI.

Some aspects described herein relate to a non-transitory computer-readable medium that stores a set of instructions for wireless communication by a network node. The set of instructions, when executed by one or more processors of the network node, may cause the network node to receive a first indication of support for FSI. The set of instructions, when executed by one or more processors of the network node, may cause the network node to transmit a second indication of network assistance information for communicating in a network using a virtual cell that is provided by a candidate network node, the virtual cell being based at least in part on the FSI.

Some aspects described herein relate to an apparatus for wireless communication. The apparatus may include means for transmitting a first indication of support for FSI. The apparatus may include means for receiving a second indication of network assistance information for communicating in a network using a virtual cell that is provided by a candidate network node, the virtual cell being based at least in part on the FSI.

Some aspects described herein relate to an apparatus for wireless communication. The apparatus may include means for receiving a first indication of support for FSI. The apparatus may include means for transmitting a second indication of network assistance information for communicating in a network using a virtual cell that is provided by a candidate network node, the virtual cell being based at least in part on the FSI.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
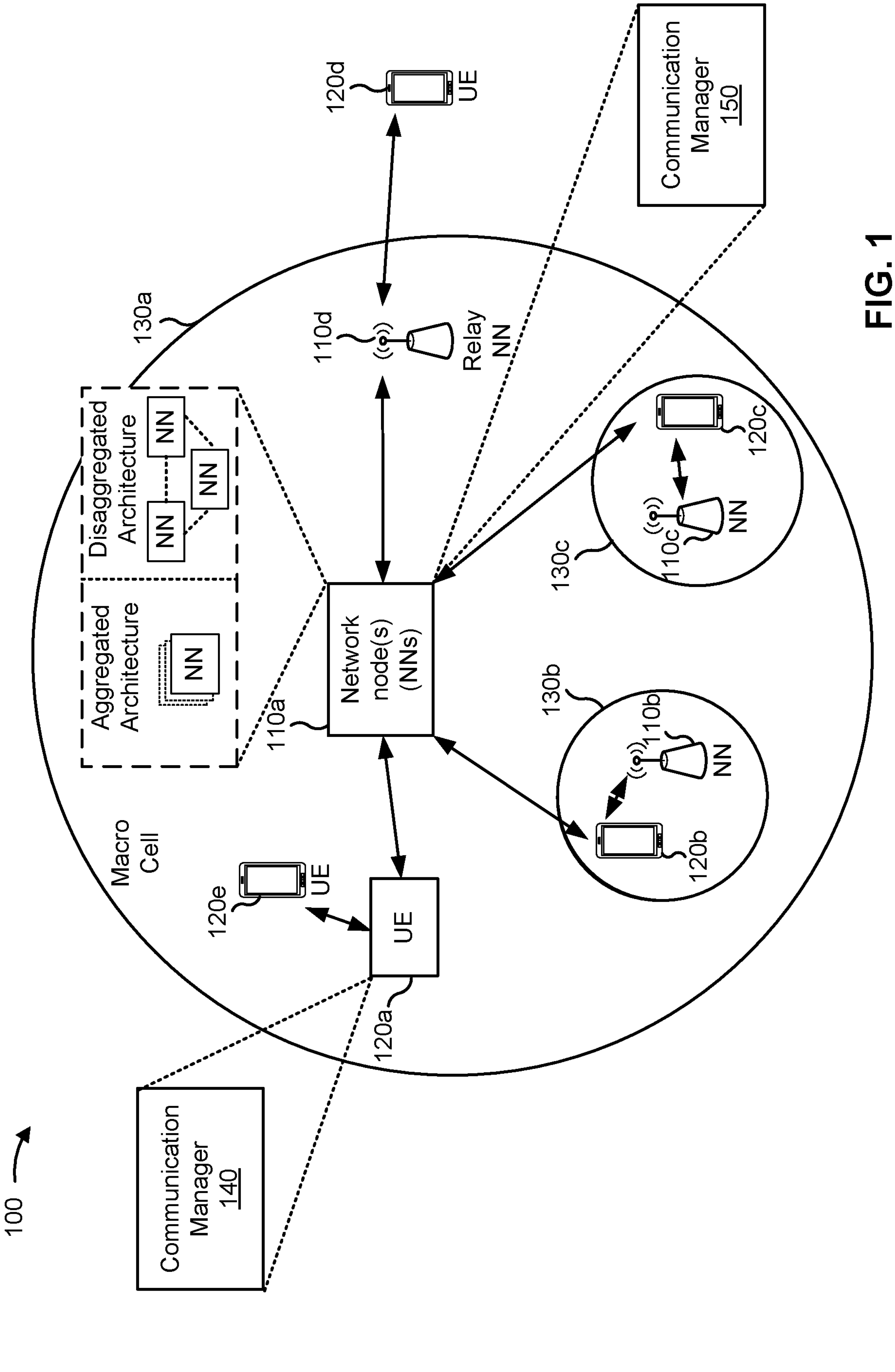
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A wireless communication network may use flexible spectrum integration (FSI) to increase an availability of air interface resources and/or spectrum. To illustrate, carrier aggregation (CA) may aggregate multiple continuous or non-continuous carriers to provide more spectrum to a UE and, consequently, provide a higher data throughput. In some aspects, a communication standard may specify allowed and/or disallowed combinations of carriers that may be used for CA. For instance, the communication standard may specify band combinations that may be used for CA, an upper bound (e.g., a maximum) on band-specific spectrum aggregation capabilities, and/or a lower bound (e.g., a minimum) on band-specific spectrum aggregation capabilities that may be implemented and/or used by a user equipment (UE).

FSI is a form of spectrum aggregation solution that may complement CA. To illustrate, FSI may be used to form a virtual cell (vCell) using multiple sub-bands (SBs) that may be disallowed for CA, and the multiple sub-bands may be grouped into one or multiple SB groups (SBGs). For example, FSI may include the use of a first sub-band that has a first bandwidth (BW) that is larger than a maximum allowed channel bandwidth (CBW) that may be used for a primary component carrier (PCC) and/or a secondary component carrier (SCC) in CA as specified by a communication standard. Alternatively, or additionally, FSI may include the use of a second sub-band with a second BW that is smaller than a minimum allowed CBW for a PCC and/or SCC in CA as specified by the communication standard. Accordingly, a vCell configured using FSI may use spectrum that is unavailable and/or disallowed for CA, resulting in more efficient usage of available spectrum.

"System information (SI)" may denote messages and/or parameters that provide configuration information and/or radio resource management details that may be used by a UE to access a wireless network. In some aspects, an SI delivery mechanism that is used for CA may be undesirable for a vCell that is based at least in part on FSI. For example, using a CA-based SI delivery mechanism for a vCell may result in a reduced spectral efficiency of the vCell that negates the benefits of using FSI to form the vCell. As one example, CA SI delivery may use component carrier (CC) specific SI configurations. A vCell equivalency of a CC-specific SI configuration may be an SB-specific SI configuration that results in the transmission of per-SB SI configurations. The use of a per-SB SI configuration may increase a signaling overhead in an FSI-based vCell, such as in scenarios where a number of aggregated SBs included in a vCell increases past a threshold. The increase in overhead may result in inefficient use of spectral resources. Accordingly, a per-SB SI configuration may not be scalable for an FSI-based vCell based at least in part on the reduction in spectral efficiency of the vCell.

Alternatively, or additionally, and based at least in part on using a CA-based SI delivery mechanism, a vCell that is configured as a candidate network node for a UE handover and/or a UE secondary cell (SCell) addition may periodically broadcast SI, and the periodic transmission of the SI by a vCell may increase a signaling overhead for a serving network node for the UE. To illustrate, in a scenario associated with simultaneous cell switching that involves multiple UEs, the serving network node may duplicate the SI in radio resource control (RRC) signaling to each UE, resulting in increased signaling overhead at the serving network node. Alternatively, or additionally, the UE may be able to decode the SI transmitted by the serving network node, but not the SI transmitted by the vCell. Accordingly, and based at least in part on decoding the SI from the serving network node, the UE may perform a handover to the vCell and, subsequently, perform a handover back to the original serving network node based at least in part on being unable to communicate with the vCell. The cycle may repeat, resulting in the UE iteratively performing handovers between the vCell and the original serving network node, resulting in inefficient use of spectral resources and/or draining a battery of the UE. The inefficient use of spectral resources may result in reduced data throughput in a wireless network and/or increased data transfer latencies, and the battery drain at the UE may lead to a shorter operating span of the UE.

Various aspects relate generally to SI acquisition for FSI. Some aspects more specifically relate to a network node indicating network assistance information that may be used by a UE to access a vCell. In some aspects, a UE may transmit a first indication of support for FSI. For instance, the UE may indicate support for carrier aggregation and/or a handover that is based at least in part on a vCell. Based at least in part on transmitting the first indication, the UE may receive a second indication of network assistance information that may be used for communicating in a network using a vCell that is provided by a candidate network node, and the vCell may be based at least in part on the FSI. As one example, the UE may receive a system information block type X1 (SIB X1) using a recommended synchronization signal block (SSB) that is indicated by the network assistance information. As another example, the UE may perform a random access channel (RACH) procedure using a RACH resource configuration that is indicated by the SI and is associated with the vCell.

In some aspects, a network node may receive a first indication of support for FSI. For instance, the network node may receive an indication that a UE supports FSI. Based at least in part on receiving the first indication of support for FSI, the network node may transmit a second indication of network assistance information that may be used to enable communicating in a network using a virtual cell that is provided by a candidate network node, such as by enabling a UE to communicate with a virtual cell that is based at least in part on FSI. For instance, the network node may indicate a recommended SSB and/or a RACH resource associated with a vCell.

Particular aspects of the subject matter described in this disclosure can be implemented to realize one or more of the following potential advantages. In some examples, by using network assistance information from a serving network node, the described techniques can be used to enable a UE to communicate with a vCell in a manner that uses fewer air interface resources relative to the network node not providing network assistance information. Alternatively, or additionally, the network node providing network assistance information may mitigate the UE performing cyclical and/or iterative handovers. As one example, the network assistance information may indicate a recommended SSB of the vCell to use for obtaining SI associated with the vCell, and the UE may attempt to decode SI from the vCell using the recommended SSB. Successfully decoding the SI and/or failure to successfully decode the SI in combination with using a recommended SSB may provide the UE with a reliability indicator of cell-level mobility using the vCell. For instance, unsuccessful decoding of the SI that is performed in combination with the use of the recommended SSB may indicate that performing a mobility procedure using the vCell may be unreliable and/or may fail. Successfully decoding of the SI that is performed in combination with the use of the recommended SSB may indicate that performing the mobility procedure may be reliable and/or may succeed. Accordingly, the UE may avoid performing iterative and/or cyclical handovers that may otherwise occur as described above. Mitigating cyclic and/or iterative handovers may increase an efficiency of spectral resource usage and/or reduce an amount of air interface resources used, resulting in increased data throughput in a wireless network and/or decreased data transfer latencies. Alternatively, or additionally, mitigating cyclic and/or iterative handovers may mitigate battery drain and/or preserve battery power at the UE, resulting in an increased operating span at the UE.

As another example, in the scenario associated with simultaneous cell switching that involves multiple UEs, the network node transmitting an indication of network assistance information to each UE may use fewer air interface resources relative to the duplicated SI in RRC signaling. For instance, the network assistance information may be transmitted in Layer 1 signaling that uses fewer air interface resources, relative to unicast RRC signaling to each UE. Using fewer air interface resources may increase data throughput and/or reduce data transfer latencies in a wireless network. Alternatively, or additionally, the network assistance information may reduce a duration of the UE searching for and/or acquiring the SI for the vCell, relative to the UE searching and/or acquiring the SI without network assistance information, resulting in reduced latencies in a handover and/or SCell addition, reduced battery drain at the UE, and/or preserved battery resources at the UE.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally, or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally, or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. An anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally, or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a UE (e.g., a UE 120) may include a communication manager 140. As described in more detail elsewhere herein, the communication manager 140 may transmit a first indication of support for FSI; and receive a second indication of network assistance information for communicating in a network using a virtual cell that is provided by a candidate network node, the virtual cell being based at least in part on the FSI. Additionally, or alternatively, the communication manager 140 may perform one or more other operations described herein.

In some aspects, a network node (e.g., a network node 110) may include a communication manager 150. As described in more detail elsewhere herein, the communication manager 150 may receive a first indication of support for FSI; and transmit a second indication of network assistance information for communicating in a network using a virtual cell that is provided by a candidate network node, the virtual cell being based at least in part on the FSJ. Additionally, or alternatively, the communication manager 150 may perform one or more other operations described herein.

As indicated above, FIG. 1 is provided as an example. Other examples may differ from what is described with regard to FIG. 1.

Figure 2:
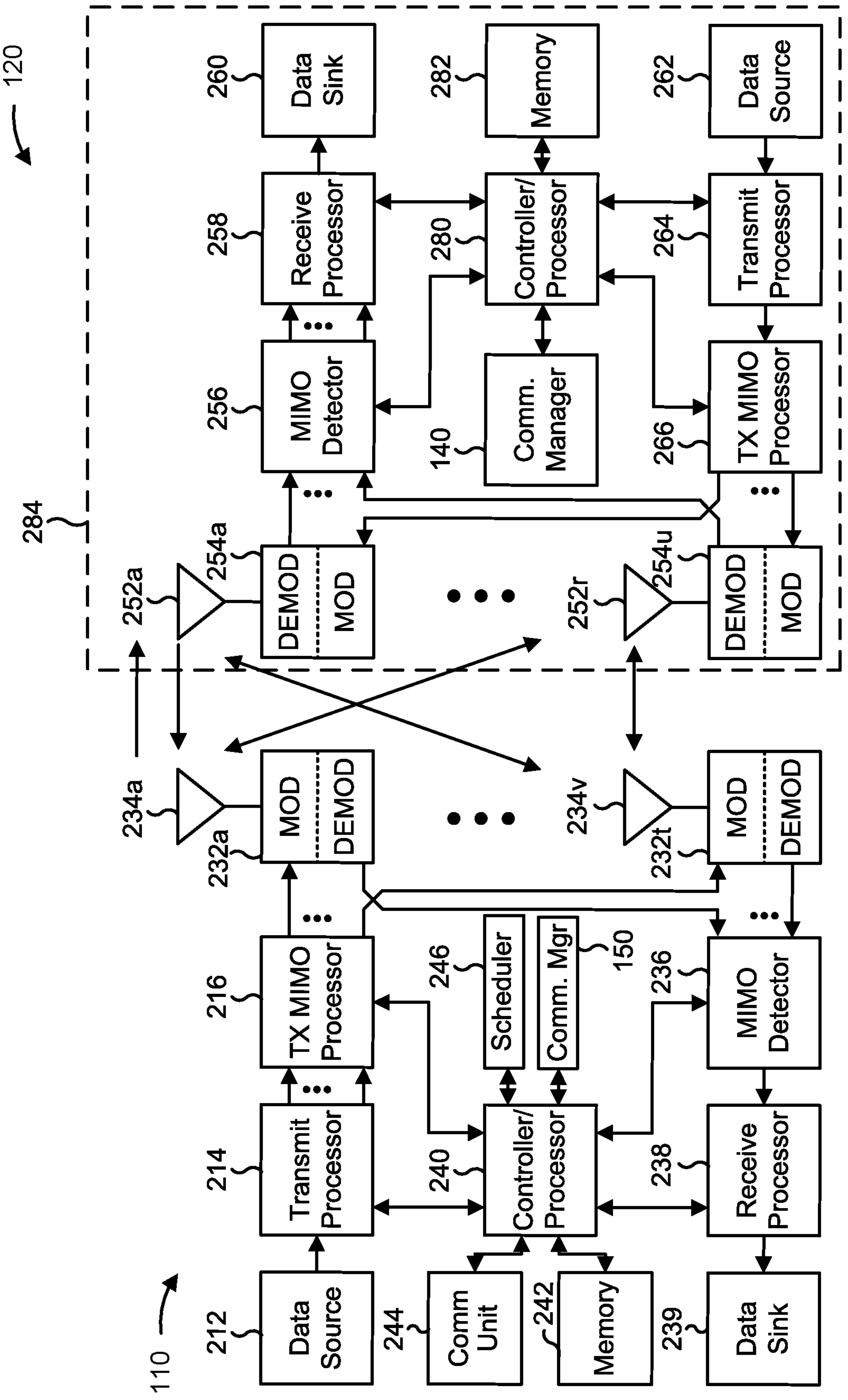
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems **254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120**) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
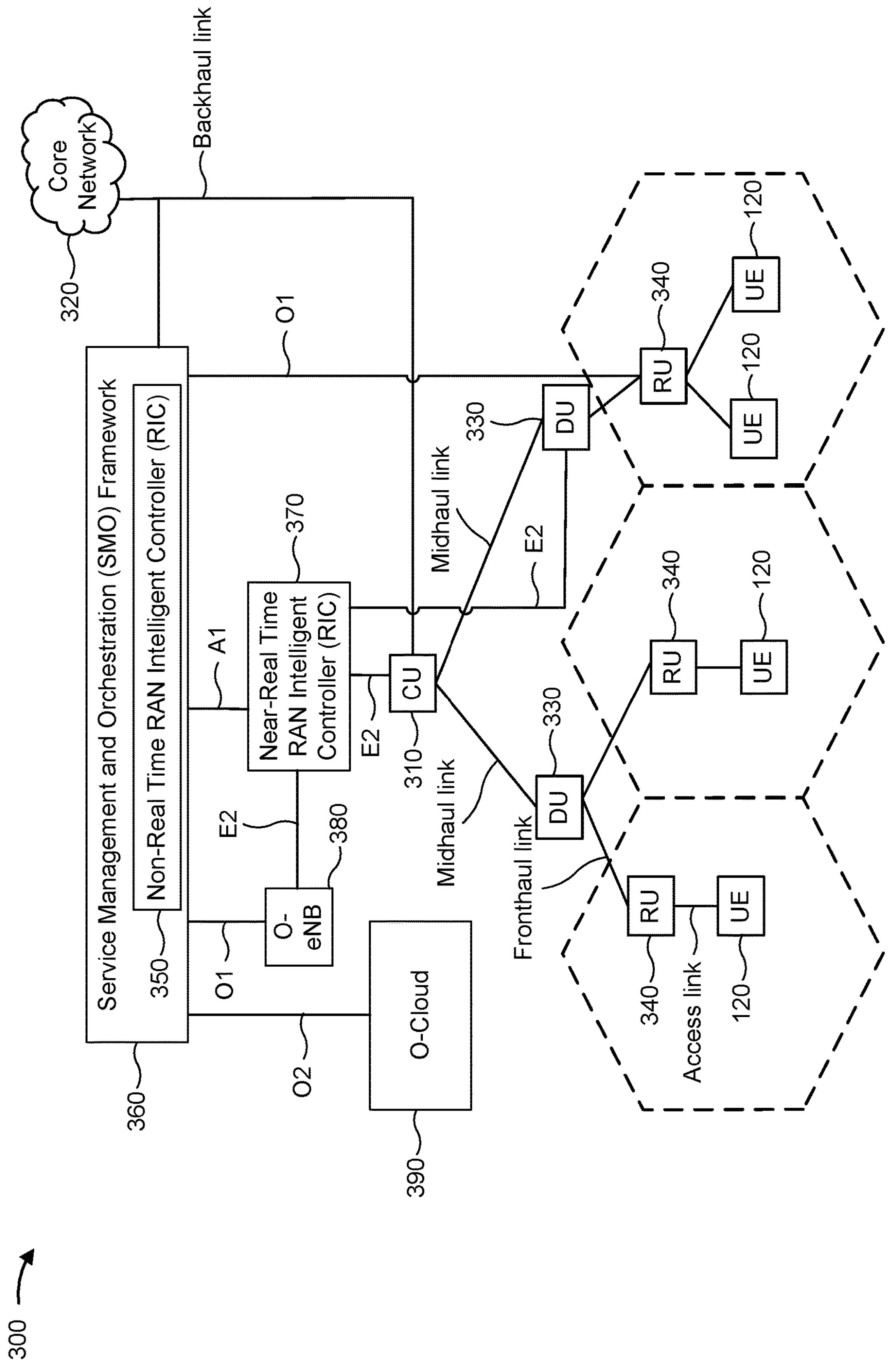
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally, or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with SI acquisition for FSI, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 900 of FIG. 9, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 900 of FIG. 9, process 1000 of FIG. 10, or other processes as described herein. In some examples, executing instructions may include running the instructions, converting the instructions, compiling the instructions, and/or interpreting the instructions, among other examples.

In some aspects, a UE (e.g., a UE 120) includes means for transmitting a first indication of support for FSI; and/or means for receiving a second indication of network assistance information for communicating in a network using a virtual cell that is provided by a candidate network node, the virtual cell being based at least in part on the FSI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for receiving a first indication of support for FSI; and/or means for transmitting a second indication of network assistance information for communicating in a network using a virtual cell that is provided by a candidate network node, the virtual cell being based at least in part on the FSI. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4:
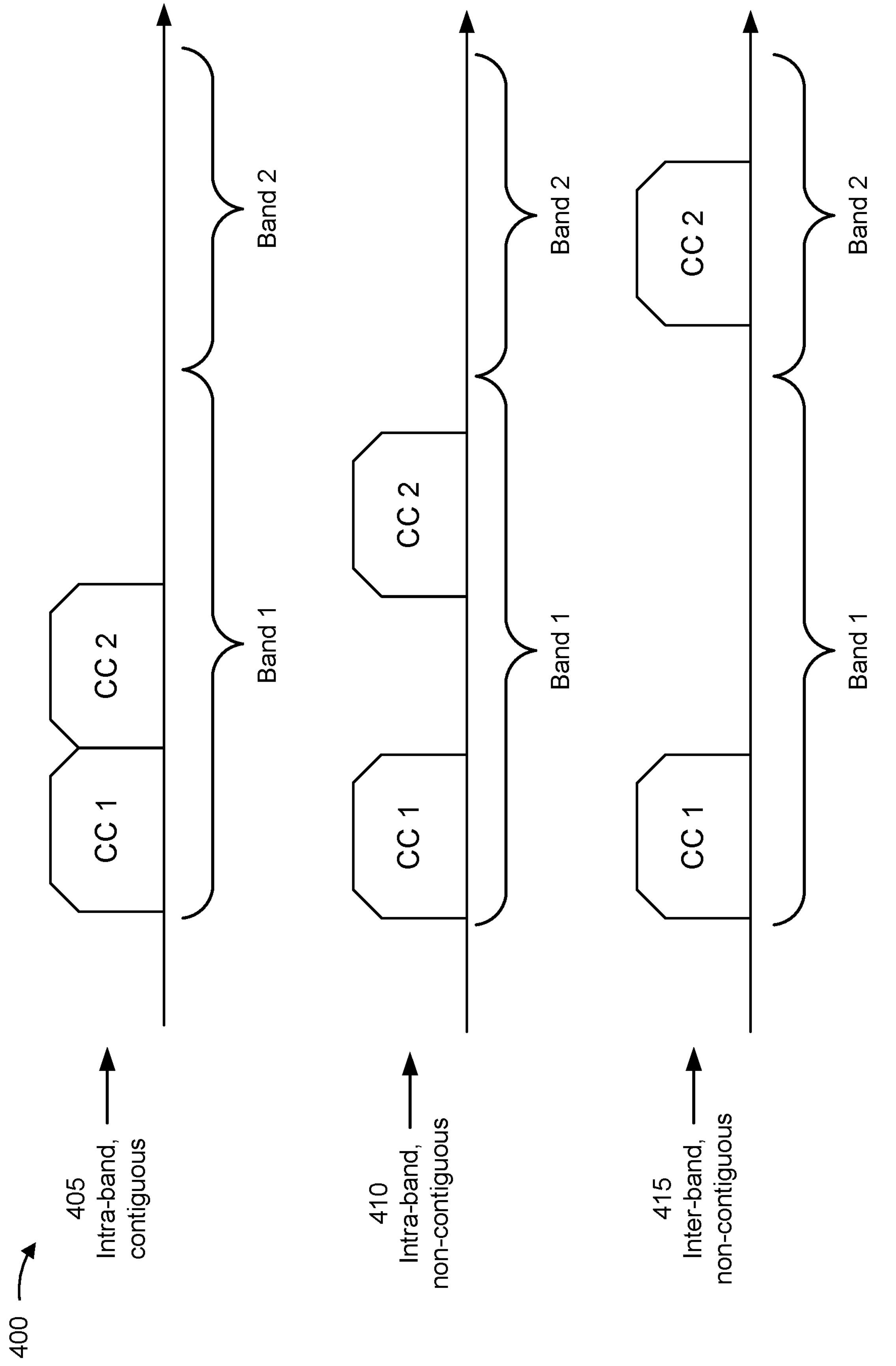
FIG. 4 is a diagram illustrating examples of carrier aggregation, in accordance with the present disclosure.

FIG. 4 is a diagram illustrating examples 400 of carrier aggregation (CA), in accordance with the present disclosure.

Carrier aggregation is a technology that enables two or more component carriers (CCs, sometimes referred to as carriers) to be combined into a single channel for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in an RRC message, DCI, and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (Pcell) and one or more secondary carriers or secondary cells (Scells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
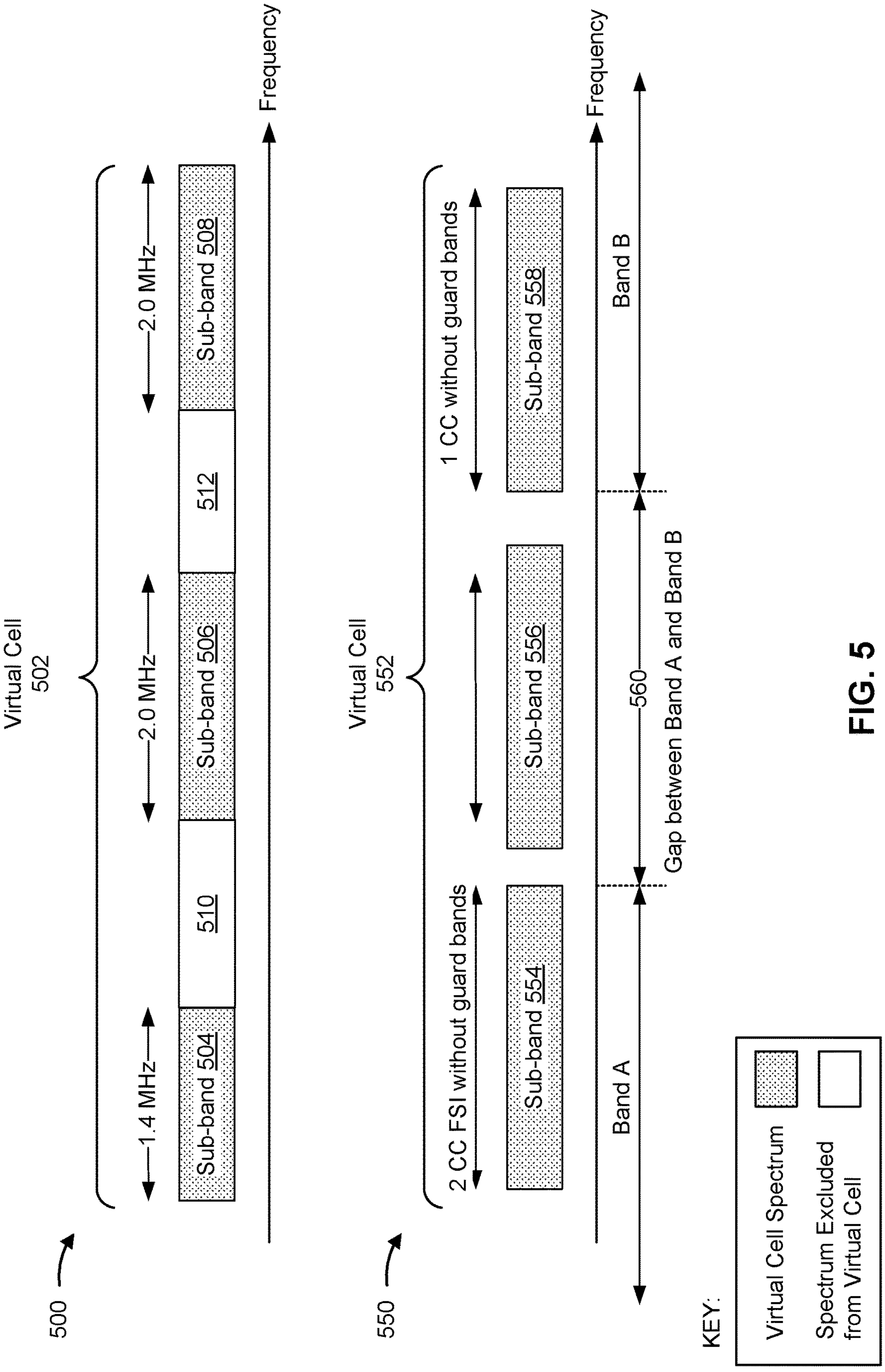
FIG. 5 is a diagram illustrating a first example and a second example of virtual cells (vCells) that are based at least in part on flexible spectrum integration, in accordance with the present disclosure.

FIG. 5 is a diagram illustrating a first example 500 and a second example 550 of vCells that are based at least in part on FSI, in accordance with the present disclosure.

Wireless communication networks and/or RANs continue to evolve the usage of available resources to improve an overall performance of a network, such as by evolving the usage to increase data throughput, decrease data transfer latencies, and/or decrease recovery errors within the network. One challenge for the networks in providing efficient services to a UE pertains to the availability of new and/or contiguous spectrum. To illustrate, an evolving RAN and/or evolving RAT may share spectrum with an existing RAN and/or existing RAT. Other options may include expanding into other unused frequencies. Accordingly, in some aspects, contiguous spectrum may have limited availability based at least in part on the evolving RAT sharing spectrum with existing RATs. Alternatively, or additionally, new, expanded spectrum may have limited availability in different regions. For instance, higher frequencies may have less availability relative to lower frequencies based at least in part on the higher frequencies being more susceptible to distortion in some regions (e.g., regions with reduced line-of-sight) that have less impact on the lower frequencies.

Some wireless communication networks may use FSI to increase an availability of air interface resources and/or spectrum. To illustrate, CA may aggregate multiple continuous or non-continuous carriers to provide more spectrum to a UE and, consequently, provide a higher data throughput as described with regard to FIG. 4. In some aspects, a communication standard may specify allowed (and/or disallowed) combinations of carriers that may be used for CA. For instance, the communication standard may specify allowed (and/or disallowed) band combinations that may be used for CA. Alternatively, or additionally, the communication may specify an upper bound (e.g., a maximum) on band-specific spectrum aggregation capabilities that may be implemented and/or used by a UE.

FSI is a form of spectrum aggregation solution that may complement CA. To illustrate, FSI may be used to form a vCell using multiple SBs that may be disallowed for CA, and the multiple sub-bands may be grouped into one or multiple SBGs. For example, FSI may include the use of a first sub-band that has a first BW that is larger than a maximum allowed CBW that may be used for a PCC and/or a SCC in CA as specified by a communication standard. Alternatively, or additionally, FSI may include the use of a second sub-band with a second BW that is smaller than a minimum allowed CBW for a PCC and/or SCC in CA as specified by the communication standard. Accordingly, a vCell configured using FSI may use spectrum that is unavailable and/or disallowed for CA, resulting in more efficient usage of available spectrum. Alternatively, or additionally, for some allowed spectrum aggregation for CA, FSI may outperform CA in various areas, such as BW adaptation latency, signaling overhead, and/or implementation complexity based at least in part on a sub-band grouping criterion being satisfied.

The first example 500 is a first vCell 502 that includes three (3) non-contiguous SBs that may be disallowed for CA (e.g., 5G CA). More particularly, the first vCell 502 includes a first sub-band 504 (shown with a dotted pattern that indicates inclusion in the vCell) that spans 1.4 MHz, a second sub-band 506 (shown with the dotted pattern) that spans 2 MHz, and a third sub-band 508 (shown with the dotted pattern) that spans 2 MHz. As shown by FIG. 5, the first sub-band 504 and the second sub-band 506 are non-contiguous based at least in part on a first frequency span 510 (shown in solid white that indicates exclusion from the vCell). Similarly, the second sub-band 506 and the third sub-band 508 are non-contiguous based at least in part on a second frequency span 512 (also shown in solid white). In some aspects, the first sub-band 504, the second sub-band 506, and the third sub-band 508 may be disallowed for CA based at least in part on the respective frequency span of each sub-band being smaller than, and/or failing to meet, a minimum CBW threshold for CA as specified by a communication standard. Accordingly, and through the use of FSI, the first vCell 502 may include spectrum that would otherwise be unavailable for use, leading to increased spectrum efficiency in a wireless network.

The second example 550 is a second vCell 552 that includes three (3) non-contiguous SBs that may be disallowed for CA. More particularly, the second vCell 552 includes a first sub-band 554 (shown with a dotted pattern that indicates inclusion in the vCell), a second sub-band 556 (shown with the dotted pattern), and a third sub-band 558 (shown with the dotted pattern). As shown by FIG. 5, the first sub-band 554 spans two (2) CCs (without guard bands) in a first band A based at least in part on the second vCell 552 being configured via FSI, and the third sub-band 558 spans one (1) CC (without guard bands) in a second band B based at least in part on the second vCell 552 being configured via FSI. As shown by reference number 560, the second sub-band 556, which is non-contiguous with both the first sub-band 554 and the second sub-band 558, is located within a gap between the first band A and the second band B. In some aspects, the first sub-band 554, the second sub-band 556, and the third sub-band 558 may be disallowed for CA based at least in part on the second sub-band 556 being located in a gap between the first band A and the second band B. Accordingly, and through the use of FSI, the second vCell 552 may include spectrum that would otherwise be unavailable for use, leading to increased spectrum efficiency in a wireless network.

In some aspects, an SI delivery mechanism that is used for CA may be undesirable for a vCell that is based at least in part on FSI. For example, using a CA-based SI delivery mechanism for a vCell may result in a reduced spectral efficiency of the vCell. That is, using the CA-based SI delivery mechanism for delivering SI associated with a vCell may consume a number of resources that negate the benefits of using FSI to form the vCell. As one example, CA SI delivery may use CC-specific SI configurations (e.g., a respective SI configuration for each CC). Accordingly, a vCell equivalency of a CC-specific SI configuration may be an SB-specific SI configuration (e.g., a per-SB SI configuration and/or a respective SI configuration for each SB). However, the use of a per-SB SI configuration may increase a signaling overhead associated with the use of an FSI-based vCell, such as in scenarios where a number of aggregated SBs included in a vCell increases past a threshold. The increase in overhead may result in inefficient use of spectral resources. Accordingly, a per-SB SI configuration may not be scalable for an FSI-based vCell based at least in part on the reduction in spectral efficiency of the vCell.

Alternatively, or additionally, and based at least in part on using a CA-based SI delivery mechanism, a vCell that is configured as a candidate network node for a UE handover and/or a UE Scell addition may periodically broadcast SI, and the periodic transmission of the SI may increase a signaling overhead for a serving network node for the UE. To illustrate, in a scenario associated with simultaneous cell switching that involves multiple UEs, the serving network node may duplicate the SI in RRC signaling to each UE, resulting in increased signaling overhead at the serving network node. Example scenarios may include vehicular communications (e.g., V2X), non-terrestrial networks (NTNs), a discontinuous transmission (DTX) configuration, and/or a discontinuous reception (DRX) configuration. Alternatively, or additionally, the UE may be able to decode the SI transmitted by the serving network node, but not the SI transmitted by the vCell. Accordingly, and based at least in part on decoding the SI from the serving network node, the UE may perform a handover to the vCell and, subsequently, perform a handover back to the original serving network node based at least in part on being unable to communicate with the vCell. The cycle may repeat, resulting in the UE iteratively performing handovers between the vCell and the original serving network node, resulting in inefficient use of spectral resources and/or draining a battery of the UE. The inefficient use of spectral resources may result in reduced data throughput in a wireless network and/or increased data transfer latencies, and the battery drain at the UE may lead to a shorter operating span of the UE.

Some techniques and apparatuses described herein provide SI acquisition for FSI. In some aspects, a UE (e.g., a UE 120) may transmit a first indication of support for FSI. For instance, the UE may indicate support for carrier aggregation and/or a handover that is based at least in part on a vCell. Based at least in part on transmitting the first indication, the UE may receive a second indication of network assistance information that may be used for communicating in a network using a vCell that is provided by a candidate network node, and the vCell may be based at least in part on the FSI. As one example, the UE may receive a SIB X1 using a recommended SSB that is indicated by the network assistance information. As another example, the UE may perform a RACH procedure using a RACH resource configuration that is indicated by the SI and is associated with the vCell.

In some aspects, a network node (e.g., a network node 110) may receive a first indication of support for FSI. For instance, the network node may receive an indication that a UE supports FSI. Based at least in part on receiving the first indication of support for FSI, the network node may transmit a second indication of network assistance information that may be used to enable communicating in a network using a virtual cell that is provided by a candidate network node, such as by enabling a UE to communicate with a virtual cell that is based at least in part on FSI. For instance, the network node may indicate a recommended SSB and/or a RACH resource associated with a vCell.

A UE indicating support for FSI may enable a network node to provide network assistance information that enables the UE to communicate with a vCell in a manner that uses fewer air interface resources relative to the network node not providing network assistance information. Alternatively, or additionally, the network node providing network assistance information may mitigate the UE performing cyclical and/or iterative handovers. As one example, the network assistance information may indicate a recommended SSB of the vCell to use for obtaining SI associated with the vCell, and the UE may attempt to decode SI from the vCell using the recommended SSB. Successfully decoding the SI and/or a failure to successfully decode the SI in combination using a recommended SSB may provide the UE with a reliability indicator of cell-level mobility using the vCell. For instance, unsuccessful decoding of the SI that is performed in combination with the use of the recommended SSB may indicate that performing a mobility procedure using the vCell may be unreliable and/or may fail. Successfully decoding of the SI that is performed in combination with the use of the recommended SSB may indicate that performing the mobility procedure may be reliable and/or may succeed. Accordingly, the UE may avoid performing iterative and/or cyclical handovers that may otherwise occur as described above. Mitigating cyclic and/or iterative handovers may increase an efficiency of spectral resource usage and/or reduce an amount of air interface resources used, resulting in increased data throughput in a wireless network and/or decreased data transfer latencies. Alternatively, or additionally, mitigating cyclic and/or iterative handovers may mitigate battery drain and/or preserve battery power at the UE, resulting in an increased operating span at the UE.

As another example, in the scenario associated with simultaneous cell switching that involves multiple UEs, the network node transmitting an indication of network assistance information to each UE may use fewer air interface resources relative to the duplicated SI in RRC signaling. For instance, the network assistance information may be transmitted in Layer 1 signaling (e.g., DCI) using fewer air interface resources relative to unicast RRC signaling to each UE. Using fewer air interface resources may increase data throughput and/or reduce data transfer latencies in a wireless network. Alternatively, or additionally, the network assistance information may reduce a duration of the UE searching and/or acquiring the SI for the vCell, relative to the UE searching and/or acquiring the SI without network assistance information, resulting in reduced latencies in a handover and/or SCell addition, reduced battery drain at the UE, and/or preserved battery resources at the UE.

As indicated above, FIG. 5 is provided as an example. Other examples may differ from what is described with regard to FIG. 5.

Figure 6:
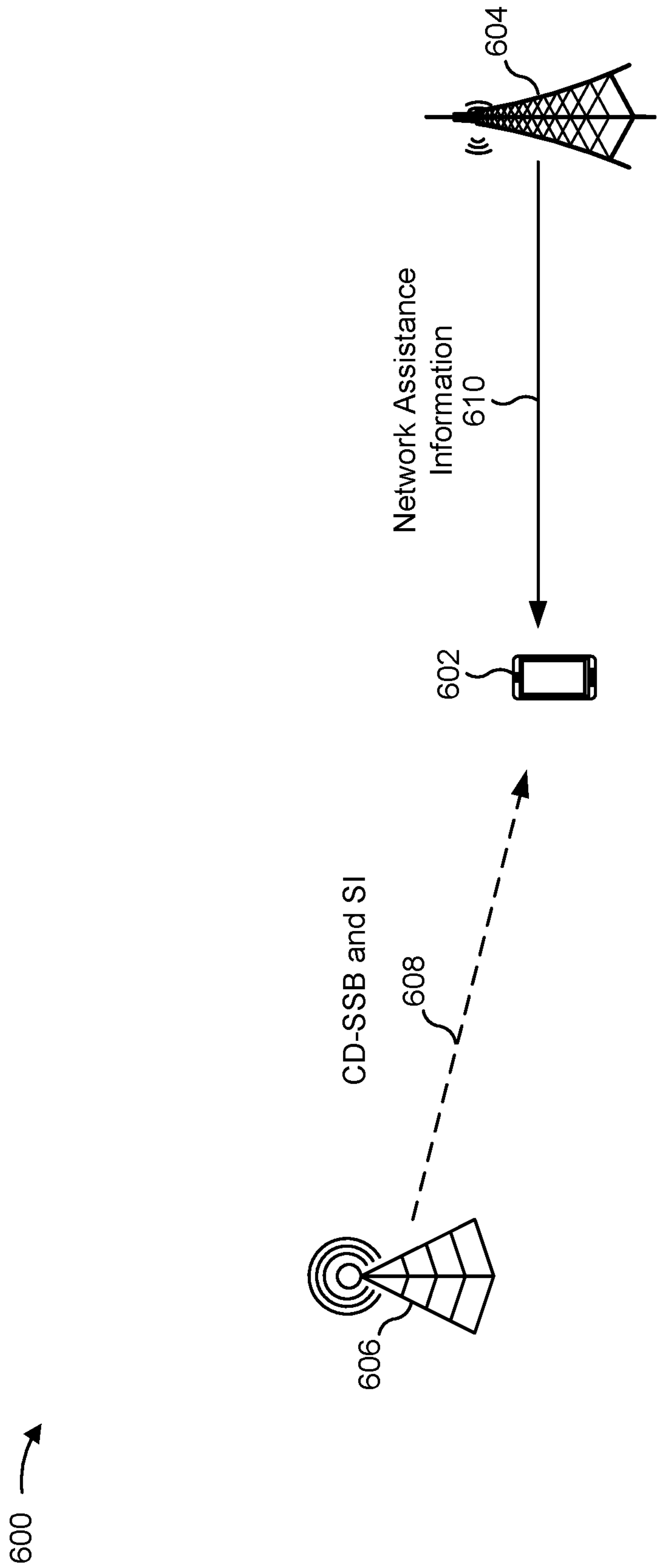
FIG. 6 is a diagram illustrating an example of network assistance information that is associated with a vCell, in accordance with the present disclosure.

FIG. 6 is a diagram illustrating an example 600 of network assistance information that is associated with a vCell, in accordance with the present disclosure.

The example 600 shown by FIG. 6 includes a UE 602 (e.g., a UE 120) that is connected to and/or served by a network node 604 (e.g., a network node 110). In some aspects, the UE 602 may operate within a threshold distance to a vCell 606 that may be provided by the network node 604 and/or another network node (e.g., another network node 110). As shown by reference number 608, the vCell 606 (e.g., by way of the network node providing the vCell 606) may transmit and/or broadcast a cell defining SSB (CD-SSB) and/or SI using an SBG of the vCell 606. In some aspects, the vCell 606 may transmit SI that includes remaining minimum system information (RMSI). As one example, the vCell 606 may transmit a SIB X1 that includes the RMSI. Alternatively, or additionally, the vCell 606 may transmit and/or broadcast the CD-SSB and/or the SI (e.g., including the RMSI) periodically using the SBG of the vCell 606.

Based at least in part on being connected to the network node 604, the UE 602 may transmit, to the network node 604, an indication of support for FSI. For example, the UE 602 may transmit UE capability information that indicates support for cell mobility that is based at least in part on a vCell and/or FSI. Alternatively, or additionally, the UE 602 may indicate any combination of a retuning gap capability for SI acquisition information from the candidate network node (e.g., whether or not a retuning gap is needed to acquire SI on a SBG of a vCell provided by a candidate network node), a minimum gap length of the retuning gap capability, a maximum number of supported SBGs, a maximum aggregated bandwidth of an SBG for an inter-frequency measurement, and/or a maximum aggregated bandwidth of an SBG an intra-frequency measurement.

In some aspects, and based at least in part on the UE 602 indicating support for FSI, the network node 604 may configure the vCell 606 as a candidate network node of the UE 602 (e.g., a candidate PCell and/or a candidate SCell), such as by transmitting a list of candidate network nodes to the UE 602 and/or one or more parameters to use in evaluating a candidate network node (e.g., a measurement configuration information, a selection criterion, beamforming information, a supported frequency band, and/or a mobility parameter).

As shown by reference number 610, the network node 604 may transmit network assistance information that enables the UE 602 to acquire the SI transmitted and/or broadcast by the vCell 606. However, the network assistance information may include information that enables the UE 602 to acquire SI transmitted and/or broadcast by multiple cells and/or multiple network nodes. In some aspects, the transmission of the network assistance information by the network node 604 may be conditional and based at least in part on the UE 602 indicating support for cell mobility that uses FSI and the vCell 606 being configured as a candidate network node (e.g., a candidate PCell and/or a candidate SCell) of the UE. As one example, and based at least in part on the vCell 606 being configured as a candidate network node of the UE, the network assistance information may include scheduling information for a SIB X1, such as scheduling information that indicates a downlink assignment of a physical downlink control channel (PDCCH) that is quasi-co-located (QCL-ed) with a recommended SSB beam of the vCell 606 (e.g., a beam with the best and/or strongest signal power level out of a set of beams) and/or a downlink assignment of a physical downlink shared channel (PDSCH) that is QCL-ed with a recommended SSB beam of the vCell 606. In some aspects, the SIB X1 indicates and/or carries RACH resource configuration that is associated with and/or may be used for requesting on-demand SI from the vCell 606. To illustrate, the SIB X1 may indicate a RACH resource configuration that may be used by the UE to request first on-demand SI for a PCell, and the first on-demand SI may be indicated and/or carried by a system information block type X2 (SIB X2). As another example, the SIB X1 may indicate a RACH resource configuration that may be used by the UE to request second on-demand SI for an SCell, and the second on-demand SI may be delivered to the UE via unicast signaling and/or a unicast message.

Alternatively, or additionally, the network assistance information may include supplementary information and/or configuration information for SSB measurements, such as a periodicity, a time offset, and/or an index of a recommended SSB beams of the vCell 606. In some aspects, the supplementary information and/or configuration information for SSB measurements indicated by the supplementary information may be configured to not overlap with a measurement object configuration. For instance, the periodicity, the time offset, and/or the index indicated for SSB measurements may not overlap with a periodicity, a time offset, and/or an index associated with the measurement object configuration.

The network node 604 may transmit the network assistance information in any combination of Layer 1 signaling, Layer 2 signaling, and/or Layer 3 signaling. As one example, the network node 604 may transmit the network assistance information in DCI, a MAC CE, and/or RRC signaling. Alternatively, or additionally, the network node 604 may indicate separate and/or multiple network assistance information in the Layer 1 signaling, Layer 2 signaling, and/or Layer 3 signaling, such as by indicating first network assistance information that may be used to acquire SI from the vCell 606 that is associated with the vCell 606 acting as a candidate PCell, and/or second network assistance information that may be used to acquire SI from the vCell 606 that is associated with the vCell 606 acting as a candidate SCell. As another example, the network node 604 may transmit the network assistance information by multiplexing the network assistance information with a measurement object configuration message. However, the network node 604 may multiplex the network assistance information with any combination of a DCI payload, a MAC CE, and/or RRC signaling. The network node 604 may transmit the network assistance information in a broadcast message, a unicast message, and/or a multi-cast message. In some aspects, the network node 604 may transmit the network assistance information periodically, while in other aspects, the network node 604 may transmit the network assistance information on-demand (e.g., in response to a request for the network assistance information).

In some aspects, the UE 602 may select an SSB (e.g., from multiple SSBs transmitted by the vCell 606) based at least in part on a measurement metric satisfying a threshold, such as an RSRP metric satisfying a first power threshold, a signal-to-interference-plus-noise ratio (SINR) metric satisfying a second power threshold, and/or a time offset metric (e.g., a time offset between the SSB and a SIB X1 transmission). In some aspects, the UE 602 may select a first SSB (e.g., out of the multiple SSBs) with a measurement metric that satisfies the threshold to reduce a latency of SI acquisition. That is, the UE 602 may select the first SSB with a measurement metric that satisfies the threshold, instead of a second SSB with the strongest measurement metric (e.g., out of the multiple SSBs) and/or the recommended SSB indicated by the network assistance information to reduce the latency of SI acquisition. Accordingly, the UE 602 may decode SIB X1 that is carried by a transmission that is QCL-ed with the selected SSB.

Alternatively, or additionally, the UE 602 may select an SSB from the multiple SSBs that is associated with the strongest measurement metric (e.g., the highest RSRP) and/or the recommended SSB indicated by the network assistance information. In a similar manner as described with regard to the first SSB above, the UE 602 may decode SIB X1 that is carried by a transmission that is QCL-ed with the SSB that has the strongest measurement metric and/or the recommended SSB. Accordingly, the UE 602 may select an SSB using a prioritization between latency and reliability. Based at least in part on latency having a higher priority than reliability, the UE 602 may select the first SSB that satisfies a threshold. Alternatively, or additionally, and based at least in part on reliability having a higher priority than latency, the UE 602 may select the SSB that has the strongest measurement metric and/or the recommended SSB.

To conserve power, the network node 604 may transmit and/or indicate the network assistance information conditionally and/or on-demand. For instance, and as described above, the network node 604 may multiplex network assistance information for the vCell 606 and/or additional candidate network nodes in Layer 1 signaling (e.g., a DCI payload), Layer 2 signaling (e.g., a MAC CE), and/or Layer 3 signaling (e.g. RRC signaling). In some aspects, the UE 602 may transmit and/or indicate a request for the network assistance information. As one example, the UE 602 may transmit an explicit request for the network assistance information, such as a request message that indicates a request for network assistance information that facilitates SI acquisition of a candidate network node. As another example, the UE 602 may transmit an implicit request for the network assistance information, such as a measurement report that implies to transmit the network assistance information.

To illustrate, the network node 604 may configure the UE 602 to generate one or more measurement reports that are based at least in part on one or more candidate network nodes and/or the network node 604. For example, the network node 604 may transmit one or more parameters to use in generating one or more measurement metrics, such as a frequency band, an air interface resource, a cell ID, a measurement type, and/or a measurement duration. The UE 602 may calculate one or more measurement metrics, such as a Layer 1 measurement metric and/or a Layer 3 measurement metric, using one or more SSBs of the candidate network nodes(s). Alternatively, or additionally, the UE 602 may generate one or more measurements using one or more SSBs transmitted by the network node 604. The UE 602 may generate and transmit a measurement report that includes the various measurement metrics. In some aspects, the measurement report may implicitly indicate to transmit network assistance information. For instance, the network node 604 may analyze the measurement report and determine to perform an RRC reconfiguration procedure that includes the UE 602 and the vCell 606, such as a handover of the UE 602 to the vCell 606 and/or adding the vCell 606 as an SCell of the UE 602. However, the network node 604 may determine to perform another type of RRC reconfiguration procedure that includes the UE 602 and/or the vCell 606. Based at least in part on determining to perform an RRC reconfiguration procedure, the network node 604 may transmit the network assistance information to the UE 602. That is, the measurement report may implicitly indicate a request to transmit the network assistance information based at least in part on a measurement metric included in the measurement report indicating to perform an RRC reconfiguration procedure.

In some aspects, the UE 602 may be configured with a reporting timer that validates when the UE 602 is allowed to transmit a measurement report to the network node 604. For example, the UE 602 may generate one or more measurement metrics that satisfy one or more thresholds as described above, such as a set of preconfigured thresholds. However, transmitting the measurement report may be disallowed while the reporting timer is active and/or has not expired. For instance, the reporting timer may gate access to uplink resources for transmitting measurement reports. That is, the uplink resources may be unavailable due to duplexing conditions and/or a higher prioritization of other downlink and/or uplink transmissions. According, instead of transmitting a measurement report, the UE 602 may transmit a request (e.g., an explicit request) for the network assistance information, such as by transmitting the request in a RACH message (e.g., a MSG1 RACH message, a MSG3 RACH message, and/or a MSGA RACH message) and/or in UCI.

As indicated above, FIG. 6 is provided as an example. Other examples may differ from what is described with regard to FIG. 6.

Figure 7:
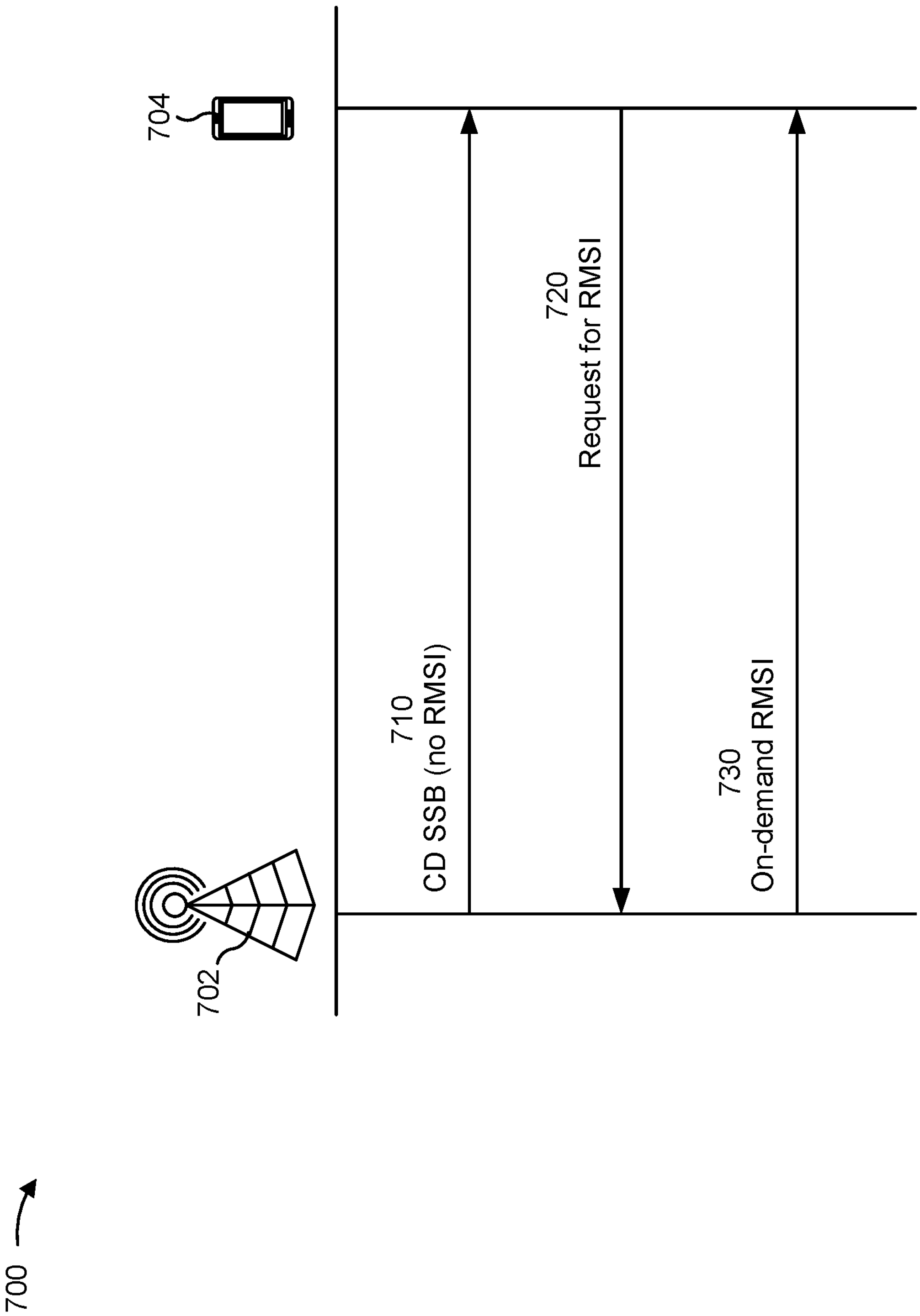
FIG. 7 is a diagram illustrating an example of on-demand remaining minimum system information, in accordance with the present disclosure.

FIG. 7 is a diagram illustrating an example 700 of on-demand RMSI, in accordance with the present disclosure. The example 700 includes a vCell 702 as described with regard to FIG. 5 that may be provided by a network node (e.g., a network node 110) using FSI, and a UE 704 (e.g., a UE 120). In some aspects, the vCell 702 is not a serving network node of the UE 704.

"On-demand RMSI" may denote RMSI that is transmitted by a network node based at least in part on receiving a request for the RMSI. To illustrate, and as shown by reference number 710, a vCell 702 may transmit (by way of a network node 110), and a UE 704 may receive, CD SSB. In some aspects, the vCell 702 may periodically transmit and/or broadcast the CD SSB without the transmission of RMSI. Alternatively, or additionally, the vCell 702 may transmit, and the UE 704 may receive, SIB1 (e.g., periodically and instead of transmitting RMSI). In some aspects, the SIB1 may indicate any combination of an initial access configuration for the vCell 702, access control information for the vCell 702, and/or a vCell configuration of the vCell 702. Some non-limiting examples of a vCell configuration may include a total number of sub-band groups configured for the vCell, a number of aggregated sub-bands for each sub-band group, a total BW of aggregated BW for each sub-band group, a numerology of each sub-band, a frequency domain location of each sub-band, and/or a duplexing mode for each sub-band.

As shown by reference number 720, the UE 704 may transmit, and the vCell 702 may receive (e.g., by way of a network node 110), a request for RMSI. In some aspects, the UE 704 may transmit the request using a RACH resource and/or as part of a RACH procedure. The RACH resource may be indicated to the UE 704 in network assistance information that is transmitted by a serving network node as described with regard to FIG. 6. Alternatively, or additionally, the UE 704 may obtain RACH resource configuration information in a SIB1 that is transmitted by the vCell 702 as described with reference number 710. To illustrate, the UE 704 may initiate a RACH procedure with the vCell 702 using a RACH resource configuration that may be at least partially indicated in network assistance information. For instance, the UE 704 may transmit the request for the on-demand RMSI in a RACH MSG1, a RACH MSG3, and/or a RACH MSGA.

As shown by reference number 730, the vCell 702 may transmit (e.g., by way of a network node 110), and the UE 704 may receive, RMSI. As one example, the vCell 702 may transmit the RMSI in a RACH MSG2, a RACH MSG4, and/or a RACH MSGB, where the RACH messages may be unicast by the vCell 702 to the UE 704. As another example, the vCell 702 may change physical broadcast channel (PBCH) content to indicate the RMSI. That is, the vCell 702 may broadcast the RMSI using the PBCH. In some aspects, the RMSI may indicate an SB configuration of the vCell 702 and/or an SBG configuration of the vCell 702. However, SB configuration information and/or SBG configuration information that is associated with the vCell 702 may be carried and/or indicated by other types of SI.

As indicated above, FIG. 7 is provided as an example. Other examples may differ from what is described with regard to FIG. 7.

Figure 8:
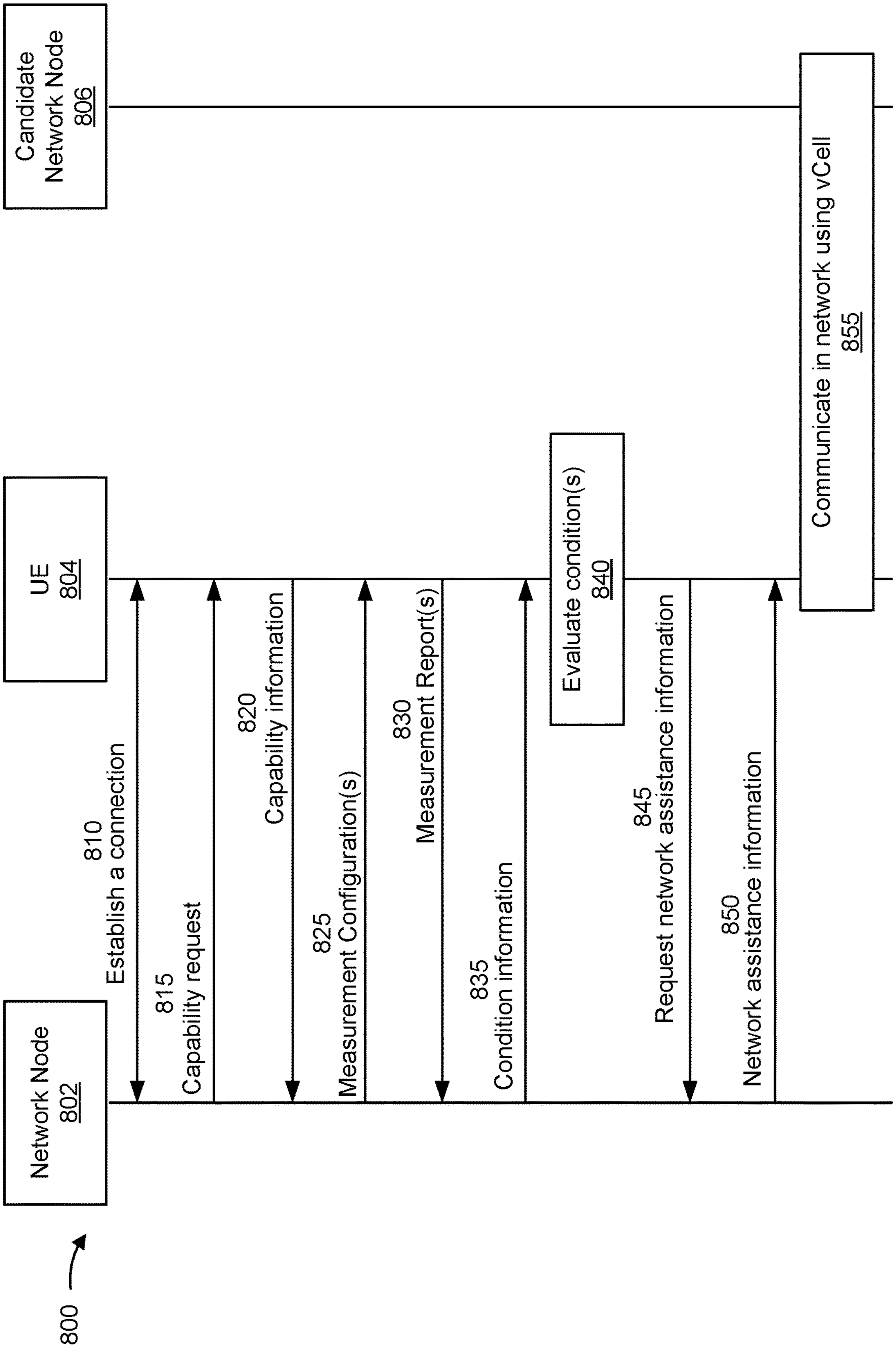
FIG. 8 is a diagram illustrating an example of a wireless communication process between a serving network node, a UE, and a candidate network node, in accordance with the present disclosure.

FIG. 8 is a diagram illustrating an example 800 of a wireless communication process between a serving network node 802 (e.g., a first network node 110), a UE 804 (e.g., a UE 120), and a candidate network node 806 (e.g., a second network node 110), in accordance with the present disclosure. In some aspects, the candidate network node 806 may provide a vCell as described with regard to FIG. 5 using FSI.

As shown by reference number 810, a serving network node 802 and a UE 804 may establish a connection. To illustrate, the UE 804 may power up in a cell coverage area provided by the serving network node 802, and the UE 804 and the serving network node 802 may perform one or more procedures (e.g., a RACH procedure and/or an RRC procedure) to establish a wireless connection. As another example, the UE 804 may move into the cell coverage area provided by the serving network node 802 and may perform a handover from the serving network node 802 to the candidate network node 806. Alternatively, or additionally, the serving network node 802 and the UE 804 may communicate via the connection based at least in part on any combination of Layer 1 signaling (e.g., DCI and/or UCI), Layer 2 signaling (e.g., a MAC control element (CE)), and/or Layer 3 signaling (e.g., RRC signaling). To illustrate, and as part of communicating via the connection, the serving network node 802 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the serving network node 802 may transmit the configuration information via Layer 3 signaling at a first point in time associated with the UE being tolerant of communication delays, and the serving network node 802 may transmit an activation of the configuration via Layer 2 signaling and/or Layer 1 signaling at a second point in time associated with the UE being intolerant to communication delays.

As shown by reference number 815, the serving network node 802 may transmit, and the UE 804 may receive, a request for capability information. To illustrate, the serving network node 802 may transmit, via RRC signaling, a request for UE capability information.

As shown by reference number 820, the UE 804 may transmit, and the serving network node 802 may receive, capability information. For clarity, FIG. 8 shows the UE 804 signaling capability information separately from establishing a connection with the serving network node 802. However, in some aspects, the UE 804 may signal the capability information as part of establishing the connection with the serving network node 802.

In some aspects, the capability information may indicate that the UE 804 includes support for FSI (e.g., mobility management that is based at least in part on FSI and/or communicating using FSI). Alternatively, or additionally, the UE 804 may indicate any combination of a retuning gap capability for SI acquisition information from the candidate network node (e.g., uses a retuning gap or does not use a retuning gap), a minimum gap length of the retuning cap capability, a maximum number of supported SBGs, a maximum aggregated bandwidth of an SBG for an inter-frequency measurement, and/or a maximum aggregated bandwidth of an SBG for an intra-frequency measurement.

As shown by reference number 825, the serving network node 802 may transmit, and the UE 804 may receive, one or more measurement configurations. In some aspects, the measurement configuration(s) may indicate one or more parameters for the UE 804 to use in generating a measurement report, such as a frequency band, an air interface resource, a cell identifier (ID), a measurement type, and/or a measurement duration.

As shown by reference number 830, the UE 804 may transmit, and the serving network node 802 may receive, one or more measurement report(s). To illustrate, the UE 804 may calculate one or more measurement metrics based at least in part on the measurement configuration(s). The measurement metric(s) may be based at least in part on one or more candidate network nodes, such as an SSB transmitted in a vCell provided by one of the candidate network nodes as described.

In some aspects, and as shown by reference number 835, the serving network node 802 may transmit, and the UE 804 may receive, one or more conditions that are associated with triggering a request for network assistance information (e.g., assistance information trigger condition(s)). The serving network node 802 may transmit the condition(s) based at least in part on receiving a measurement report from the UE 804. For instance, the serving network node 802 may evaluate the measurement report transmitted as described with regard to reference number 850 and identify that a signal power level of an SSB (e.g., an SSB transmitted by a candidate network node via a vCell) is trending toward a handover threshold. Accordingly, the serving network node 802 may transmit an assistance information trigger condition, such as a trigger threshold and/or a measurement threshold, that the UE 804 may use to determine when to transmit a request for network assistance information. While the example 800 includes the serving network node 802 transmitting the condition(s), other examples may not include the serving network node 802 transmitting the condition(s).

In some aspects, and as shown by reference number 840, the UE 804 may evaluate the one or more assistance information trigger conditions. For instance, the UE 804 may detect an occurrence of the assistance information trigger condition, such as by determining that a measurement metric that is based at least in part on a vCell satisfies a measurement threshold. That is, the assistance information trigger condition may be the measurement metric satisfying the measurement threshold.

In some aspects, and as shown by reference number 845, the UE 804 may transmit, and the serving network node 802 may receive, a request for network assistance information. To illustrate, the UE 804 may transmit an indication of the request in Layer 1 signaling, Layer 2 signaling, and/or Layer 3 signaling.

As shown by reference number 850, the serving network node 802 may transmit, and the UE 804 may receive, network assistance information. As described above, the network assistance information may indicate SI acquisition information for a candidate network node that provides a vCell. In some aspects, the network assistance information may be multiplexed with a measurement object configuration. However, and as described above, the network assistance information may be received in Layer 1 signaling, Layer 2 signaling, and/or Layer 3 signaling. In some aspects, the network assistance information may be multiplexed with a DCI payload, a MAC CE, and/or RRC signaling.

The network assistance information may include scheduling information for acquiring a SIB X1 from the candidate network node. As one example, the network assistance information may include a first downlink assignment for a PDCCH that is QCL-ed with a first recommended SSB beam (e.g., that may be used to acquire the SIB X1) and/or a second downlink assignment for a PDSCH that is QCL-ed with the recommended SSB beam. Alternatively, or additionally, the network assistance information may include supplementary information for the recommended SSB. Some non-limiting examples of supplementary information may include a periodicity of the recommended SSB, a time offset of the recommended SSB, and/or an index of the recommended SSB.

As shown by reference number 855, the UE 804 may communicate in a network based at least in part on the candidate network node 806. As one example, the UE 804 may add the candidate network node 806 and/or the vCell provided by the candidate network node 806 as an SCell for CA. Alternatively, or additionally, the UE 804 may perform a handover to the candidate network node 806.

In some aspects, the UE 804 may receive SI from the candidate network node (e.g., via the vCell) using the network assistance information. As one example, the UE 804 may receive a SIB X1 from the candidate network node 806 based at least in part on using a recommended SSB indicated by the network assistance information. Alternatively, or additionally, the UE 804 may select between the recommended SSB and a different SSB based at least in part on a prioritization between a latency of SI acquisition and a coverage area size (e.g., reliability).

As another example, the UE 804 may receive a SIB1 from the candidate network node, and transmit a request for an on-demand RMSI. The UE 804 may transmit the request based at least in part on the network assistance information, such as by using a RACH resource configuration that is indicated by the network assistance information and/or as part of a RACH procedure. In some aspects, the UE 804 may receive the on-demand RMSI from the candidate network node 806 via a unicast message and/or a broadcast message. To illustrate, the network assistance information may indicate a physical random access channel (PRACH) preamble index, an association between an SSB and a RACH occasion, a control resource set (CORESET) configuration associated with the candidate network node 806, and/or a RACH search space set.

As indicated above, FIG. 8 is provided as an example. Other examples may differ from what is described with regard to FIG. 8.

Figure 9:
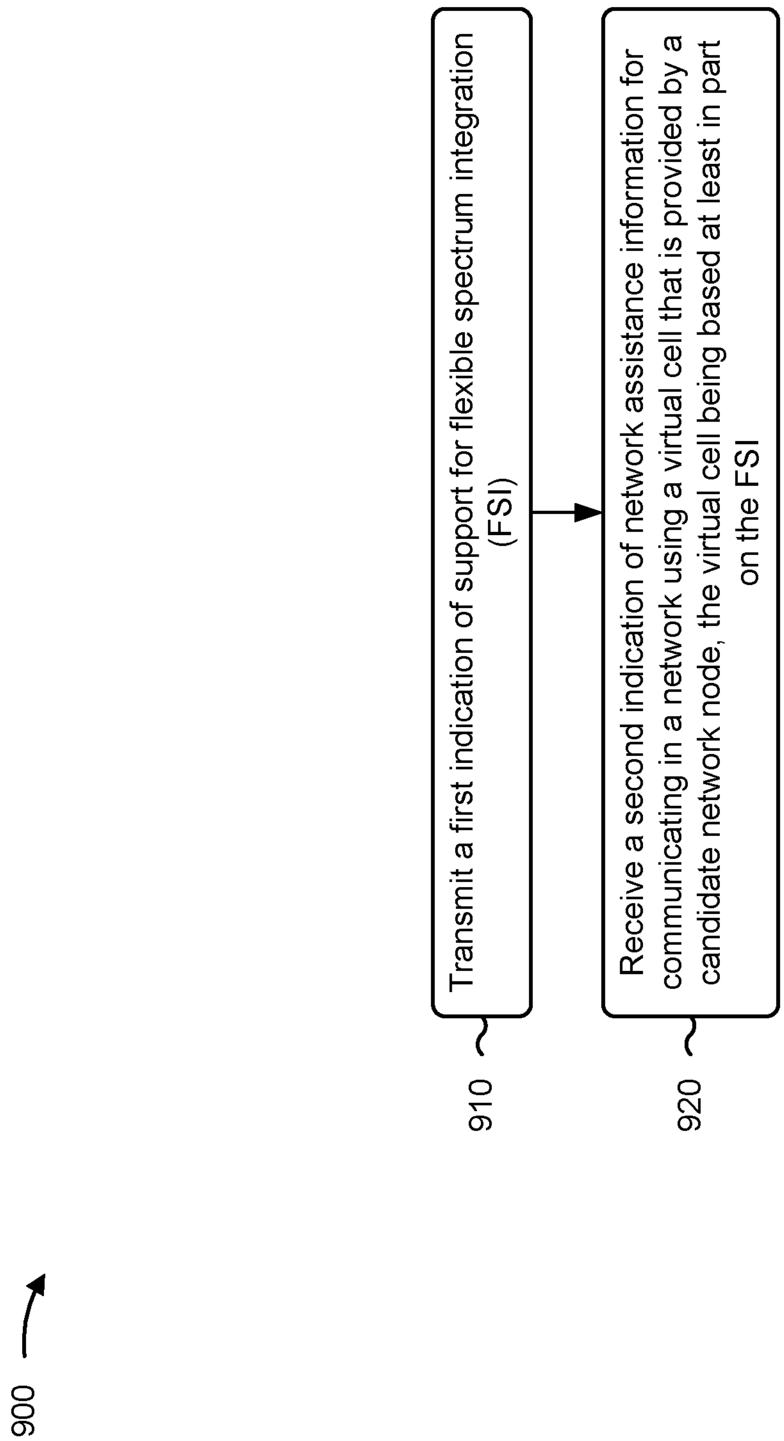
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with SI acquisition for FSI.

As shown in FIG. 9, in some aspects, process 900 may include transmitting a first indication of support for FSI (block 910). For example, the UE (e.g., using transmission component 1104 and/or communication manager 1106, depicted in FIG. 11) may transmit a first indication of support for FSI, as described above, e.g., in connection with FIG. 8.

As further shown in FIG. 9, in some aspects, process 900 may include receiving a second indication of network assistance information for communicating in a network using a virtual cell that is provided by a candidate network node, the virtual cell being based at least in part on the FSI (block 920). For example, the UE (e.g., using reception component 1102 and/or communication manager 1106, depicted in FIG. 11) may receive a second indication of network assistance information for communicating in a network using a virtual cell that is provided by a candidate network node, the virtual cell being based at least in part on the FSI, as described above, e.g., in connection with FIG. 6 and FIG. 8.

Process 900 may include additional aspects, such as any single aspect or any combination of aspects described below and/or in connection with one or more other processes described elsewhere herein.

In a first aspect, receiving the second indication includes receiving the second indication of the network assistance information from a serving network node (e.g., as described in connection with FIG. 6 and FIG. 8).

In a second aspect, the network assistance information indicates SI acquisition information for the candidate network node (e.g., as described in connection with FIG. 6 and FIG. 8).

In a third aspect, receiving the second indication of the network assistance information includes receiving a communication that includes the network assistance information multiplexed with a measurement object configuration (e.g., as described in connection with FIG. 6 and FIG. 8).

In a fourth aspect, receiving the second indication of the network assistance information includes receiving the second indication in at least one of Layer 1 signaling, Layer 2 signaling, or Layer 3 signaling (e.g., as described in connection with FIG. 6 and FIG. 8).

In a fifth aspect, the Layer 1 signaling includes DCI, the Layer 2 signaling includes a MAC CE, or the Layer 3 signaling includes RRC signaling (e.g., as described in connection with FIG. 6 and FIG. 8).

In a sixth aspect, receiving the second indication of the network assistance information includes receiving the second indication of the network assistance information a communication that is multiplexed with the DCI, the MAC CE, or the RRC signaling (e.g., as described in connection with FIG. 6 and FIG. 8).

In a seventh aspect, communicating in the network includes at least one of aggregation using the virtual cell that is provided by the candidate network node, or a handover to the virtual cell that is provided by the candidate network node (e.g., as described in connection with FIG. 6 and FIG. 8).

In an eighth aspect, the network assistance information includes scheduling information for acquiring a SIB X1 from the candidate network node (e.g., as described in connection with FIG. 6 and FIG. 8).

In a ninth aspect, the scheduling information indicates at least one of a first downlink assignment for a PDCCH that is QCL-ed with a first recommended SSB beam, or a second downlink assignment for a physical downlink shared channel (PDSCH) that is QCL-ed with the recommended SSB beam (e.g., as described in connection with FIG. 6 and FIG. 8).

In a tenth aspect, the network assistance information includes supplementary information for a recommended SSB (e.g., as described in connection with FIG. 6 and FIG. 8).

In an eleventh aspect, the supplementary information indicates at least one of a periodicity of the recommended SSB, a time offset of the recommended SSB, or an index of the recommended SSB (e.g., as described in connection with FIG. 6 and FIG. 8).

In a twelfth aspect, process 900 includes receiving the SIB X1 from the candidate network node based at least in part on using a recommended SSB indicated by the network assistance information (e.g., as described in connection with FIG. 6 and FIG. 8).

In a thirteenth aspect, process 900 includes receiving the SIB X1 from the candidate network node based at least in part on using a different SSB than a recommended SSB that is indicated by the network assistance information (e.g., as described in connection with FIG. 8).

In a fourteenth aspect, process 900 includes selecting between a recommended SSB indicated by the network assistance information and a different SSB based at least in part on a prioritization between latency of system information acquisition, and a coverage area size (e.g., as described in connection with FIG. 8).

In a fifteenth aspect, process 900 includes receiving, from a serving network node, a measurement configuration for generating a measurement metric using the candidate network node, and transmitting a measurement report that includes the measurement metric (e.g., as described in connection with FIG. 6 and FIG. 8).

In a sixteenth aspect, process 900 includes receiving a third indication of an assistance information trigger condition, detecting an occurrence of the assistance information trigger condition, and transmitting a request for the network assistance information, and receiving the second indication of the network assistance information is based at least in part on transmitting the request (e.g., as described in connection with FIG. 8).

In a seventeenth aspect, receiving the third indication of the assistance information trigger condition is based at least in part on transmitting the measurement report (e.g., as described in connection with FIG. 8).

In an eighteenth aspect, the assistance information trigger condition includes a measurement threshold (e.g., as described in connection with FIG. 8).

In a nineteenth aspect, process 900 includes receiving a request for capability information, and transmitting the first indication of the support for FSI includes transmitting UE capability information that indicates the support for FSI (e.g., as described in connection with FIG. 6 and FIG. 8).

In a twentieth aspect, the UE capability information indicates at least one of a retuning gap capability for SI acquisition information from the candidate network node, a minimum gap length of the retuning cap capability, a maximum number of supported SBGs, or a maximum aggregated bandwidth of an SBG for at least one of an inter-frequency measurement, or an intra-frequency measurement (e.g., as described in connection with FIG. 6 and FIG. 8).

In a twenty-first aspect, process 900 includes receiving a SIB1 from the candidate network node, and transmitting, using the network assistance information, a request for an on-demand RMSI (e.g., as described in connection with FIG. 7 and FIG. 8).

In a twenty-second aspect, process 900 includes receiving the on-demand RMSI from the candidate network node via at least one of a unicast message, or a broadcast message (e.g., as described in connection with FIG. 7 and FIG. 8).

In a twenty-third aspect, the network assistance information indicates RACH resource configuration, and transmitting the request includes transmitting the request using the RACH resource configuration and as part of a RACH procedure (e.g., as described in connection with FIG. 7 and FIG. 8).

In a twenty-fourth aspect, the RACH resource configuration indicates at least one of a physical random access channel preamble index, an association between a SSB and a RACH occasion, a CORESET configuration associated with the candidate network node, or a RACH search space set (e.g., as described in connection with FIG. 8).

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
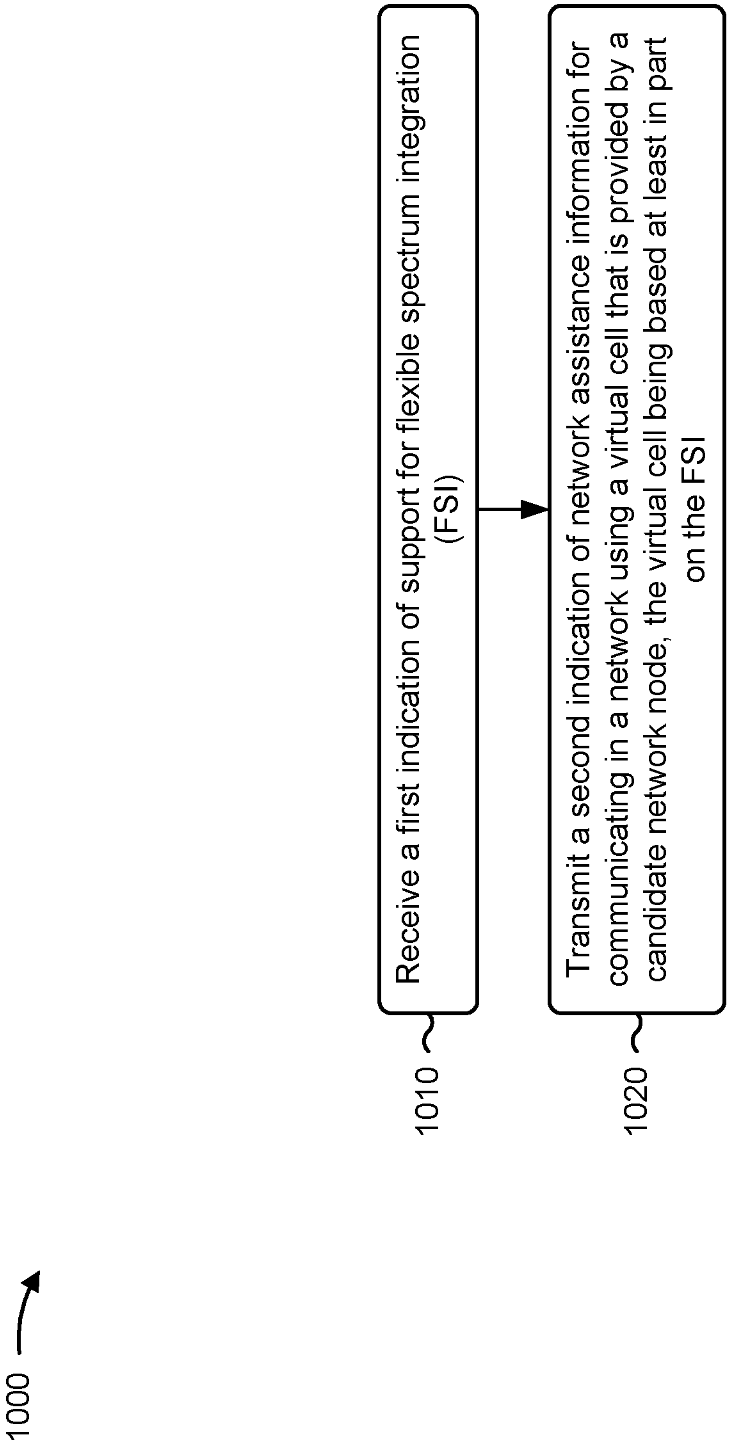
FIG. 10 is a diagram illustrating an example process performed, for example, at a network node or an apparatus of a network node, in accordance with the present disclosure.

FIG. 10 is a diagram illustrating an example process 1000 performed, for example, at a network node or an apparatus of a network node, in accordance with the present disclosure. Example process 1000 is an example where the apparatus or the network node (e.g., network node 110) performs operations associated with SI acquisition for FSI.

As shown in FIG. 10, in some aspects, process 1000 may include receiving a first indication of support for FSI (block 1010). For example, the network node (e.g., using reception component 1202 and/or communication manager 1206, depicted in FIG. 12) may receive a first indication of support for FSI, as described above.

As further shown in FIG. 10, in some aspects, process 1000 may include transmitting a second indication of network assistance information for communicating in a network using a virtual cell that is provided by a candidate network node, the virtual cell being based at least in part on the FSI (block 1020). For example, the network node (e.g., using transmission component 1204 and/or communication manager 1206, depicted in FIG. 12) may transmit a second indication of network assistance information for communicating in a network using a virtual cell that is provided by a candidate network node, the virtual cell being based at least in part on the FSI, as described above in connection with FIG. 5, FIG. 6, and FIG. 8.

Process 1000 may include additional aspects, such as any single aspect or any combination of aspects described below and/or in connection with one or more other processes described elsewhere herein.

In a first aspect, the network assistance information indicates SI acquisition information for the candidate network node (e.g., as described in connection with FIG. 6 and FIG. 8).

In a second aspect, transmitting the second indication of the network assistance information includes multiplexing the network assistance information multiplexed with a measurement object configuration (e.g., as described in connection with FIG. 6 and FIG. 8).

In a third aspect, transmitting the second indication of the network assistance information includes transmitting the second indication in at least one of Layer 1 signaling, Layer 2 signaling, or Layer 3 signaling (e.g., as described in connection with FIG. 6 and FIG. 8).

In a fourth aspect, the Layer 1 signaling includes DCI, the Layer 2 signaling includes a MAC CE, or the Layer 3 signaling includes RRC signaling (e.g., as described in connection with FIG. 6 and FIG. 8).

In a fifth aspect, transmitting the second indication of the network assistance information includes multiplexing the second indication of the network assistance information a communication with the DCI, the MAC CE, or the RRC signaling (e.g., as described in connection with FIG. 6 and FIG. 8).

In a sixth aspect, communicating in the network includes at least one of aggregation using the vCell that is provided by the candidate network node, or a handover to the virtual cell that is provided by the candidate network node (e.g., as described in connection with FIG. 6 and FIG. 8).

In a seventh aspect, the network assistance information includes scheduling information for acquiring a SIB X1 from the candidate network node (e.g., as described in connection with FIG. 6 and FIG. 8).

In an eighth aspect, the scheduling information indicates at least one of a first downlink assignment for a PDCCH that is QCL-ed with a first recommended SSB beam, or a second downlink assignment for a physical downlink shared channel (PDSCH) that is QCL-ed with the recommended SSB beam (e.g., as described in connection with FIG. 6 and FIG. 8).

In a ninth aspect, the network assistance information includes supplementary information for a recommended SSB (e.g., as described in connection with FIG. 6 and FIG. 8).

In a tenth aspect, the supplementary information indicates at least one of a periodicity of the recommended SSB, a time offset of the recommended SSB, or an index of the recommended SSB (e.g., as described in connection with FIG. 6 and FIG. 8).

In an eleventh aspect, process 1000 includes transmitting a measurement configuration for generating a measurement metric using the candidate network node, and receiving a measurement report that includes the measurement metric (e.g., as described in connection with FIG. 8).

In a twelfth aspect, process 1000 includes transmitting a third indication of an assistance information trigger condition, and receiving a request for the network assistance information, and transmitting the second indication of the network assistance information is based at least in part on receiving the request (e.g., as described in connection with FIG. 7 and FIG. 8).

In a thirteenth aspect, transmitting the third indication of the assistance information trigger condition is based at least in part on receiving the measurement report (e.g., as described in connection with FIG. 7 and FIG. 8).

In a fourteenth aspect, the assistance information trigger condition includes a measurement threshold (e.g., as described in connection with FIG. 7 and FIG. 8).

In a fifteenth aspect, process 1000 includes transmitting a request for capability information, and receiving the first indication of the support for FSI includes receiving UE capability information that indicates the support for FSI (e.g., as described in connection with FIG. 6 and FIG. 8).

In a sixteenth aspect, the UE capability information indicates at least one of a retuning gap capability for SI acquisition information from the candidate network node, a minimum gap length of the retuning cap capability, a maximum number of supported SBGs, or a maximum aggregated bandwidth of an SBG for at least one of an inter-frequency measurement, or an intra-frequency measurement (e.g., as described in connection with FIG. 6 and FIG. 8).

In a seventeenth aspect, the network assistance information indicates a RACH resource configuration associated with the candidate network node.

In an eighteenth aspect, the RACH resource configuration indicates at least one of a physical random access channel preamble index, an association between a SSB and a RACH occasion, a CORESET configuration associated with the candidate network node, or a RACH search space set (e.g., as described in connection with FIG. 8).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
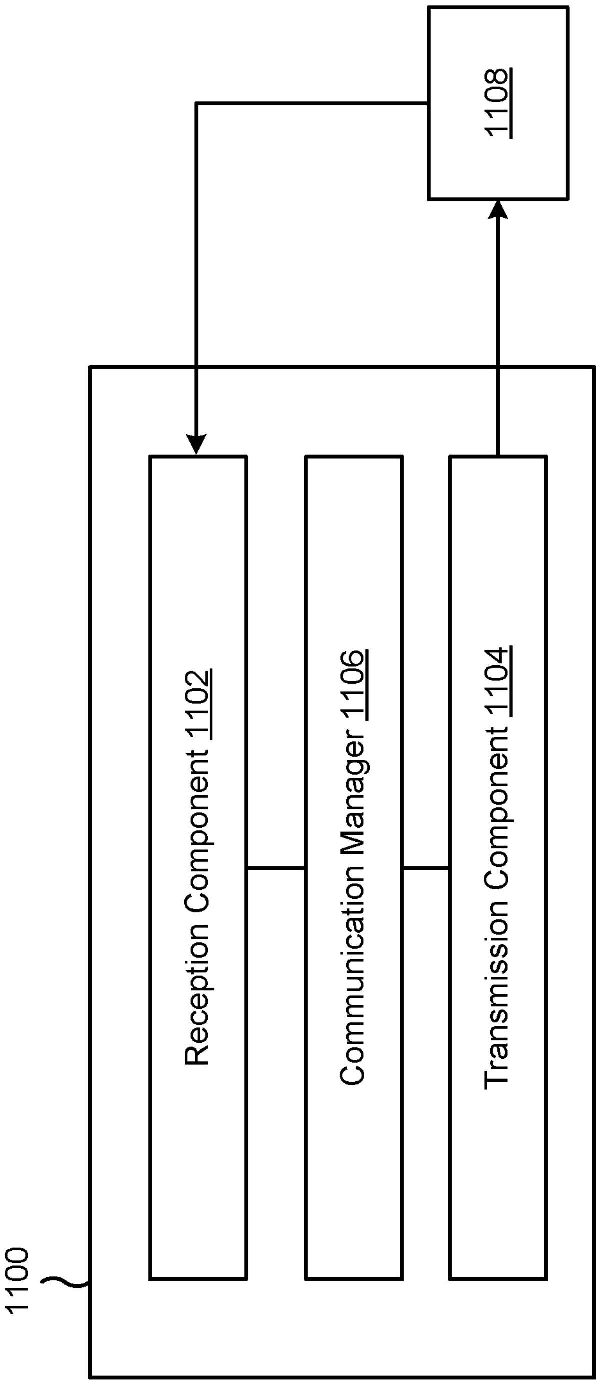
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit a first indication of support for FSI. The reception component 1102 may receive a second indication of network assistance information for communicating in a network using a virtual cell that is provided by a candidate network node, the virtual cell being based at least in part on the FSI.

The reception component 1102 may receive the SIB X1 from the candidate network node based at least in part on using a recommended SSB indicated by the network assistance information. Alternatively, or additionally, the reception component 1102 may receive the SIB X1 from the candidate network node based at least in part on using a different SSB than a recommended SSB that is indicated by the network assistance information. In some aspects, the communication manager 1106 may select between a recommended SSB indicated by the network assistance information and a different SSB based at least in part on a prioritization between latency of system information acquisition, and a coverage area size.

The reception component 1102 may receive, from a serving network node, a measurement configuration for generating a measurement metric using the candidate network node. Alternatively, or additionally, the transmission component 1104 may transmit a measurement report that includes the measurement metric.

The reception component 1102 may receive a third indication of an assistance information trigger condition. Alternatively, or additionally, the communication manager 1106 may detect an occurrence of the assistance information trigger condition. In some aspects, the transmission component 1104 may transmit a request for the network assistance information, and receiving the second indication of the network assistance information is based at least in part on transmitting the request.

The reception component 1102 may receive a request for capability information. In some aspects, the reception component 1102 may receive a SIB1 from the candidate network node.

The transmission component 1104 may transmit, using the network assistance information, a request for an on-demand RMSI. Alternatively, or additionally, the reception component 1102 may receive the on-demand RMSI from the candidate network node via at least one of a unicast message, or a broadcast message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
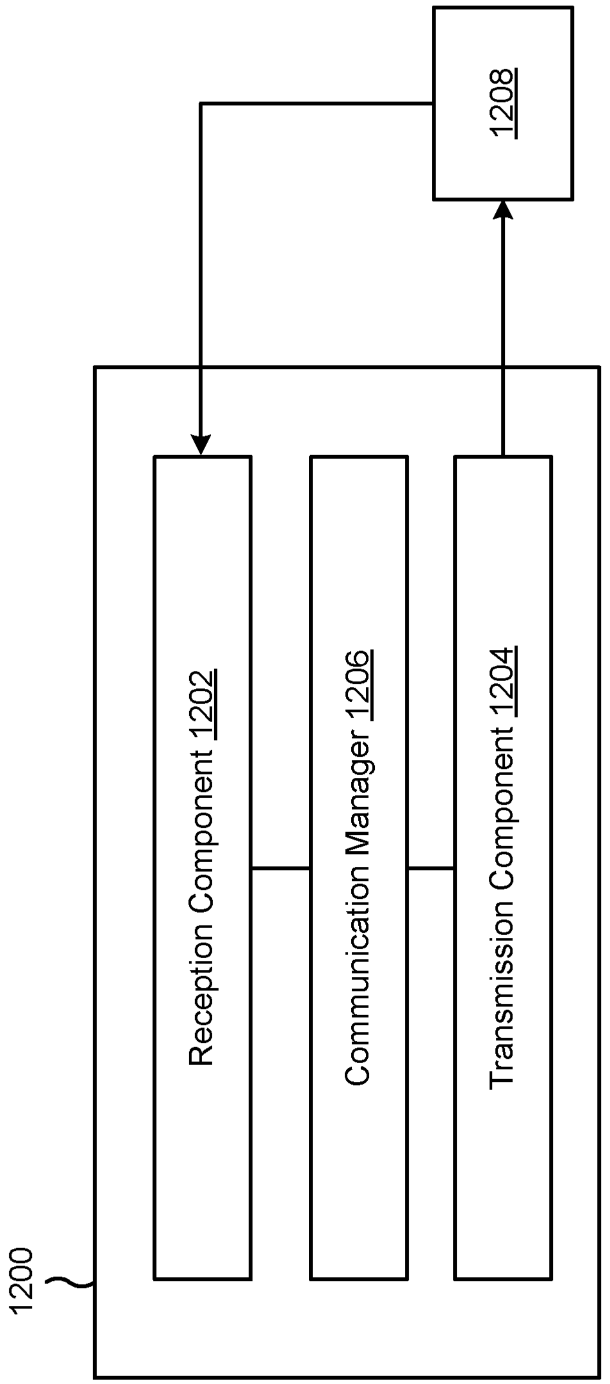
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a first indication of support for FSI. The transmission component 1204 may transmit a second indication of network assistance information for communicating in a network using a virtual cell that is provided by a candidate network node, the virtual cell being based at least in part on the FSI.

The transmission component 1204 may transmit a measurement configuration for generating a measurement metric using the candidate network node. Alternatively, or additionally, the reception component 1202 may receive a measurement report that includes the measurement metric. In some aspects, the transmission component 1204 may transmit a third indication of an assistance information trigger condition. The reception component 1202 may receive a request for the network assistance information and transmitting the second indication of the network assistance information is based at least in part on receiving the request.

In some aspects, the transmission component 1204 may transmit a request for capability information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: transmitting a first indication of support for flexible spectrum integration (FSI); and receiving a second indication of network assistance information for communicating in a network using a virtual cell that is provided by a candidate network node, the virtual cell being based at least in part on the FSI.

Aspect 2: The method of Aspect 1, wherein receiving the second indication comprises: receiving the second indication of the network assistance information from a serving network node.

Aspect 3: The method of any of Aspects 1-2, wherein the network assistance information indicates system information (SI) acquisition information for the candidate network node.

Aspect 4: The method of any of Aspects 1-3, wherein receiving the second indication of the network assistance information comprises: receiving a communication that includes the network assistance information multiplexed with a measurement object configuration.

Aspect 5: The method of any of Aspects 1-4, wherein receiving the second indication of the network assistance information comprises: receiving the second indication in at least one of: Layer 1 signaling, Layer 2 signaling, or Layer 3 signaling.

Aspect 6: The method of any of Aspects 1-5, wherein the Layer 1 signaling comprises downlink control information (DCI), wherein the Layer 2 signaling comprises a medium access control (MAC) control element (CE), or wherein the Layer 3 signaling comprises radio resource control (RRC) signaling.

Aspect 7: The method of any of Aspects 1-6, wherein receiving the second indication of the network assistance information comprises: receiving the second indication of the network assistance information a communication that is multiplexed with the DCI, the MAC CE, or the RRC signaling.

Aspect 8: The method of any of Aspects 1-7, wherein communicating in the network comprises at least one of: carrier aggregation using the virtual cell that is provided by the candidate network node, or a handover to the virtual cell that is provided by the candidate network node.

Aspect 9: The method of any of Aspects 1-8, wherein the network assistance information includes scheduling information for acquiring a system information block type X1 (SIB X1) from the candidate network node.

Aspect 10: The method of Aspect 9, wherein the scheduling information indicates at least one of: a first downlink assignment for a physical downlink control channel (PDCCH) that is quasi-co-located (QCL-ed) with a first recommended synchronization signal block (SSB) beam, or a second downlink assignment for a physical downlink shared channel (PDSCH) that is QCL-ed with the recommended SSB beam.

Aspect 11: The method of Aspect 8 or Aspect 9, wherein the network assistance information includes supplementary information for a recommended synchronization signal block (SSB).

Aspect 12: The method of Aspect 11, wherein the supplementary information indicates at least one of: a periodicity of the recommended SSB, a time offset of the recommended SSB, or an index of the recommended SSB.

Aspect 13: The method of any of Aspects 1-9, further comprising: receiving the SIB X1 from the candidate network node based at least in part on using a recommended synchronization signal block (SSB) indicated by the network assistance information.

Aspect 14: The method of any of Aspects 1-9, further comprising: receiving the SIB X1 from the candidate network node based at least in part on using a different synchronization signal block (SSB) than a recommended SSB that is indicated by the network assistance information.

Aspect 15: The method of any of Aspects 1-9, further comprising: selecting between a recommended synchronization signal block (SSB) indicated by the network assistance information and a different SSB based at least in part on a prioritization between: latency of system information acquisition, and a coverage area size.

Aspect 16: The method of any of Aspects 1-15, further comprising: receiving, from a serving network node, a measurement configuration for generating a measurement metric using the candidate network node; and transmitting a measurement report that includes the measurement metric.

Aspect 17: The method of Aspect 16, further comprising: receiving a third indication of an assistance information trigger condition; detecting an occurrence of the assistance information trigger condition; and transmitting a request for the network assistance information, wherein receiving the second indication of the network assistance information is based at least in part on transmitting the request.

Aspect 18: The method of Aspect 17, wherein receiving the third indication of the assistance information trigger condition is based at least in part on transmitting the measurement report.

Aspect 19: The method of Aspect 17 or Aspect 18, wherein the assistance information trigger condition comprises a measurement threshold.

Aspect 20: The method of any of Aspects 1-19, further comprising: receiving a request for capability information, wherein transmitting the first indication of the support for FSI comprises: transmitting UE capability information that indicates the support for FSI. wherein transmitting the first indication of the support for FSI comprises: transmitting UE capability information that indicates the support for FSI.

Aspect 21: The method of Aspect 20, wherein the UE capability information indicates at least one of: a retuning gap capability for system information (SI) acquisition information from the candidate network node, a minimum gap length of the retuning cap capability, a maximum number of supported sub-band groups (SBGs), or a maximum aggregated bandwidth of an SBG for at least one of: an inter-frequency measurement, or an intra-frequency measurement.

Aspect 22: The method of any of Aspects 1-21, further comprising: receiving a system information block type 1 (SIB1) from the candidate network node; and transmitting, using the network assistance information, a request for an on-demand remaining minimum system information (RMSI).

Aspect 23: The method of Aspect 22, further comprising: receiving the on-demand RMSI from the candidate network node via at least one of: a unicast message, or a broadcast message.

Aspect 24: The method of Aspect 22, wherein the network assistance information indicates random access channel (RACH) resource configuration, and wherein transmitting the request comprises: transmitting the request using the RACH resource configuration and as part of a RACH procedure.

Aspect 25: The method of Aspect 24, wherein the RACH resource configuration indicates at least one of: a physical random access channel preamble index, an association between a synchronization signal block (SSB) and a RACH occasion, a control resource set (CORESET) configuration associated with the candidate network node, or a RACH search space set.

Aspect 26: A method of wireless communication performed by a network node, comprising: receiving a first indication of support for flexible spectrum integration (FSI); and transmitting a second indication of network assistance information for communicating in a network using a virtual cell that is provided by a candidate network node, the virtual cell being based at least in part on the FSI.

Aspect 27: The method of Aspect 26, wherein the network assistance information indicates system information (SI) acquisition information for the candidate network node.

Aspect 28: The method of any of Aspects 26-27, wherein transmitting the second indication of the network assistance information comprises: multiplexing the network assistance information multiplexed with a measurement object configuration.

Aspect 29: The method of any of Aspects 26-28, wherein transmitting the second indication of the network assistance information comprises: transmitting the second indication in at least one of: Layer 1 signaling, Layer 2 signaling, or Layer 3 signaling.

Aspect 30: The method of Aspect 29, wherein the Layer 1 signaling comprises downlink control information (DCI), wherein the Layer 2 signaling comprises a medium access control (MAC) control element (CE), or wherein the Layer 3 signaling comprises radio resource control (RRC) signaling.

Aspect 31: The method of any of Aspects 26-30, wherein transmitting the second indication of the network assistance information comprises: multiplexing the second indication of the network assistance information a communication with the DCI, the MAC CE, or the RRC signaling.

Aspect 32: The method of any of Aspects 26-31, wherein communicating in the network comprises at least one of: carrier aggregation using the virtual cell that is provided by the candidate network node, or a handover to the virtual cell that is provided by the candidate network node.

Aspect 33: The method of any of Aspects 26-32, wherein the network assistance information includes scheduling information for acquiring a system information block type X1 (SIB X1) from the candidate network node.

Aspect 34: The method of Aspect 33, wherein the scheduling information indicates at least one of: a first downlink assignment for a physical downlink control channel (PDCCH) that is quasi-co-located (QCL-ed) with a first recommended synchronization signal block (SSB) beam, or a second downlink assignment for a physical downlink shared channel (PDSCH) that is QCL-ed with the recommended SSB beam.

Aspect 35: The method of Aspect 33 or Aspect 34, wherein the network assistance information includes supplementary information for a recommended synchronization signal block (SSB).

Aspect 36: The method of Aspect 35, wherein the supplementary information indicates at least one of: a periodicity of the recommended SSB, a time offset of the recommended SSB, or an index of the recommended SSB.

Aspect 37: The method of any of Aspects 26-36, further comprising: transmitting a measurement configuration for generating a measurement metric using the candidate network node; and receiving a measurement report that includes the measurement metric.

Aspect 38: The method of any of Aspects 26-37, further comprising: transmitting a third indication of an assistance information trigger condition; and receiving a request for the network assistance information, wherein transmitting the second indication of the network assistance information is based at least in part on receiving the request.

Aspect 39: The method of Aspect 38, wherein transmitting the third indication of the assistance information trigger condition is based at least in part on receiving the measurement report.

Aspect 40: The method of Aspect 38 or Aspect 39, wherein the assistance information trigger condition comprises a measurement threshold.

Aspect 41: The method of any of Aspects 26-40, further comprising: transmitting a request for capability information, wherein receiving the first indication of the support for FSI comprises: receiving user equipment (UE) capability information that indicates the support for FSI. wherein receiving the first indication of the support for FSI comprises: receiving user equipment (UE) capability information that indicates the support for FSI.

Aspect 42: The method of Aspect 41, wherein the UE capability information indicates at least one of: a retuning gap capability for system information (SI) acquisition information from the candidate network node, a minimum gap length of the retuning cap capability, a maximum number of supported sub-band groups (SBGs), or a maximum aggregated bandwidth of an SBG for at least one of: an inter-frequency measurement, or an intra-frequency measurement.

Aspect 43: The method of any of Aspects 26-42, wherein the network assistance information indicates a random access channel (RACH) resource configuration associated with the candidate network node.

Aspect 44: The method of Aspect 43, wherein the RACH resource configuration indicates at least one of: a physical random access channel preamble index, an association between a synchronization signal block (SSB) and a RACH occasion, a control resource set (CORESET) configuration associated with the candidate network node, or a RACH search space set.

Aspect 45: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-25.

Aspect 46: An apparatus for wireless communication at a device, the apparatus comprising one or more memories and one or more processors coupled to the one or more memories, the one or more processors configured to cause the device to perform the method of one or more of Aspects 1-25.

Aspect 47: An apparatus for wireless communication, the apparatus comprising at least one means for performing the method of one or more of Aspects 1-44.

Aspect 48: A non-transitory computer-readable medium storing code for wireless communication, the code comprising instructions executable by one or more processors to perform the method of one or more of Aspects 1-25.

Aspect 49: A non-transitory computer-readable medium storing a set of instructions for wireless communication, the set of instructions comprising one or more instructions that, when executed by one or more processors of a device, cause the device to perform the method of one or more of Aspects 1-25.

Aspect 50: A device for wireless communication, the device comprising a processing system that includes one or more processors and one or more memories coupled with the one or more processors, the processing system configured to cause the device to perform the method of one or more of Aspects 1-25

Aspect 51: An apparatus for wireless communication at a device, the apparatus comprising one or more memories and one or more processors coupled to the one or more memories, the one or more processors individually or collectively configured to cause the device to perform the method of one or more of Aspects 1-25.

Aspect 52: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 26-44.

Aspect 53: An apparatus for wireless communication at a device, the apparatus comprising one or more memories and one or more processors coupled to the one or more memories, the one or more processors configured to cause the device to perform the method of one or more of Aspects 26-44.

Aspect 54: An apparatus for wireless communication, the apparatus comprising at least one means for performing the method of one or more of Aspects 1-44.

Aspect 55: A non-transitory computer-readable medium storing code for wireless communication, the code comprising instructions executable by one or more processors to perform the method of one or more of Aspects 26-44.

Aspect 56: A non-transitory computer-readable medium storing a set of instructions for wireless communication, the set of instructions comprising one or more instructions that, when executed by one or more processors of a device, cause the device to perform the method of one or more of Aspects 26-44.

Aspect 57: A device for wireless communication, the device comprising a processing system that includes one or more processors and one or more memories coupled with the one or more processors, the processing system configured to cause the device to perform the method of one or more of Aspects 26-44.

Aspect 58: An apparatus for wireless communication at a device, the apparatus comprising one or more memories and one or more processors coupled to the one or more memories, the one or more processors individually or collectively configured to cause the device to perform the method of one or more of Aspects 26-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors, coupled to the one or more memories, configured to cause the UE to:

transmit a first indication of support for flexible spectrum integration (FSI), wherein support of FSI indicates support of one or more virtual cells using flexible sub-band quantities or sizes; and receive a second indication of network assistance information for communicating in a network using a virtual cell that is provided by a candidate network node, the virtual cell being based at least in part on the FSI, wherein the virtual cell comprises a plurality of sub-bands.

2. The apparatus of claim 1, wherein the one or more processors, to cause the UE to receive the second indication, are configured to cause the UE to:

receive the second indication of the network assistance information from a serving network node.

3. The apparatus of claim 1, wherein the network assistance information indicates system information (SI) acquisition information for the candidate network node.

4. The apparatus of claim 1, wherein the one or more processors, to cause the UE to receive the second indication of the network assistance information, are configured to cause the UE to:

receive the second indication in at least one of:

Layer 1 signaling,

Layer 2 signaling, or

Layer 3 signaling.

5. The apparatus of claim 1, wherein the one or more processors, to cause the UE to communicate in the network, are configured to cause the UE to:

carrier aggregation using the virtual cell that is provided by the candidate network node, or a handover to the virtual cell that is provided by the candidate network node.

6. The apparatus of claim 1, wherein the network assistance information includes scheduling information for acquiring a system information block type X1 (SIB X1) from the candidate network node.

7. The apparatus of claim 6, wherein the network assistance information includes supplementary information for a recommended synchronization signal block (SSB).

8. The apparatus of claim 1, wherein the one or more processors are further configured to cause the UE to:

receive, from a serving network node, a measurement configuration for generating a measurement metric using the candidate network node; and transmit a measurement report that includes the measurement metric.

9. The apparatus of claim 8, wherein the one or more processors are further configured to cause the UE to:

receive a third indication of an assistance information trigger condition;

detect an occurrence of the assistance information trigger condition; and transmit a request for the network assistance information, wherein receiving the second indication of the network assistance information is based at least in part on transmitting the request.

10. The apparatus of claim 1, wherein the one or more processors are further configured to cause the UE to:

receive a system information block type 1 (SIB1) from the candidate network node; and transmit, using the network assistance information, a request for an on-demand remaining minimum system information (RMSI).

11. The apparatus of claim 1, wherein the plurality of sub-bands comprises two non-contiguous sub-bands.

12. The apparatus of claim 1, wherein a sub-band of the plurality of sub-bands has a bandwidth that is larger than a maximum channel bandwidth size allowed for a primary component carrier or a secondary component carrier in carrier aggregation.

13. The apparatus of claim 1, wherein a sub-band of the plurality of sub-bands has a bandwidth that is smaller than a minimum channel bandwidth size allowed for a primary component carrier or a secondary component carrier in carrier aggregation.

14. A method of wireless communication performed by a user equipment (UE), comprising:

transmitting a first indication of support for flexible spectrum integration (FSI), wherein support of FSI indicates support of one or more virtual cells using flexible sub-band quantities or sizes; and receiving a second indication of network assistance information for communicating in a network using a virtual cell that is provided by a candidate network node, the virtual cell being based at least in part on the FSI, wherein the virtual cell comprises a plurality of sub-bands.

15. The method of claim 14, wherein the network assistance information indicates system information (SI) acquisition information for the candidate network node.

16. The method of claim 14, wherein the network assistance information includes scheduling information for acquiring a system information block type X1 (SIB X1) from the candidate network node.

17. The method of claim 16, further comprising:

receiving the SIB X1 from the candidate network node based at least in part on using a recommended synchronization signal block (SSB) indicated by the network assistance information.

18. The method of claim 16, further comprising:

receiving the SIB X1 from the candidate network node based at least in part on using a different synchronization signal block (SSB) than a recommended SSB that is indicated by the network assistance information.

19. The method of claim 16, further comprising:

selecting between a recommended synchronization signal block (SSB) indicated by the network assistance information and a different SSB based at least in part on a prioritization between:

latency of system information acquisition, and a coverage area size.

20. A non-transitory computer-readable medium storing a set of instructions for wireless communication, the set of instructions comprising:

one or more instructions that, when executed by one or more processors of a user equipment (UE), cause the UE to:

transmit a first indication of support for flexible spectrum integration (FSI), wherein support of FSI indicates support of one or more virtual cells using flexible sub-band quantities or sizes; and receive a second indication of network assistance information for communicating in a network using a virtual cell that is provided by a candidate network node, the virtual cell being based at least in part on the FSI, wherein the virtual cell comprises a plurality of sub-bands.

* * * * *